(12) United States Patent
Davies et al.

(10) Patent No.: US 11,825,394 B1
(45) Date of Patent: Nov. 21, 2023

(54) DATA PRESENTATION SYSTEM AND METHOD

(71) Applicant: Tanzle, Inc., Scotts Valley, CA (US)

(72) Inventors: Oliver T. Davies, Felton, CA (US);
Kris T. Force, Oakland, CA (US);
Eduard J. Gregor, Santa Cruz, CA (US)

(73) Assignee: Tanzle, Inc., Scotts Valley, CA (US)

( * ) Notice: Subject to any disclaimer, the term of this patent is extended or adjusted under 35 U.S.C. 154(b) by 0 days.

(21) Appl. No.: 17/571,139

(22) Filed: Jan. 7, 2022

Related U.S. Application Data

(60) Provisional application No. 63/251,567, filed on Oct. 1, 2021.

(51) Int. Cl.
| | |
|---|---|
| *H04W 4/90* | (2018.01) |
| *H04N 13/117* | (2018.01) |
| *G08B 27/00* | (2006.01) |
| *H04N 13/194* | (2018.01) |
| *H04N 13/183* | (2018.01) |

(52) U.S. Cl.
CPC ............ *H04W 4/90* (2018.02); *G08B 27/001* (2013.01); *H04N 13/117* (2018.05); *H04N 13/183* (2018.05); *H04N 13/194* (2018.05)

(58) Field of Classification Search
CPC .. H04N 13/117; H04N 13/194; H04N 13/183; G08B 27/001; H04W 4/90
USPC ........................................................ 455/404.1
See application file for complete search history.

(56) References Cited

U.S. PATENT DOCUMENTS

2023/0004689 A1\* 1/2023 Santarone ............... G01S 19/48

\* cited by examiner

*Primary Examiner* — Maria El-Zoobi
(74) *Attorney, Agent, or Firm* — David R. Stevens; Stevens Law Group

(57) ABSTRACT

A computer-program product may cause one or more processors to store certain files and perform certain operations. The files may include one or more audio files, each being a sonification of a signal corresponding to one or more physical sensors located within a physical building. The operations may include rendering, from a point of view selected by a user, one or more images of a virtual model of the physical building and one or more virtual sensors. Each virtual sensor may be positioned within the virtual model so as to match a location of a corresponding physical sensor of the one or more physical sensors within the physical building. The operations may further include receiving, from the user, an instruction to play at least one audio file of the one or more audio files and playing, in response to receiving the instruction, the at least one audio file.

14 Claims, 12 Drawing Sheets

DATA PRESENTATION SYSTEM AND METHOD

RELATED APPLICATIONS

This application claims the benefit of U.S. Provisional Patent Application Ser. No. 63/251,567 filed Oct. 1, 2021, which is hereby incorporated by reference.

BACKGROUND

Field of the Invention

This invention relates to presenting data and, more particularly, to novel systems and methods for presenting data in visual and audio formats that facilitate human assimilation of the data.

Background Art

Ever since humans began to collect data, they have faced the dilemma of how to best store, access, use, and share that data. Most attempts in this regard have involved "flattening" the 3D world onto planar surfaces (e.g., paintings, drawings, tapestries, etc.) that are static and do not change with time. Such two-dimensional (2D) pictures can work well when the data at issue is limited in scope and/or relatively simple. However, as data increases in complexity and interrelatedness and/or changes with time, the utility of static 2D pictures decreases rapidly. Accordingly, what is desired is a presentation system that provides a richer and more informative visual experience when accessing, using, and sharing data that is complex and interrelated and/or changes with time.

BRIEF SUMMARY OF THE INVENTION

In view of the foregoing, in accordance with the invention as embodied and broadly described herein, a method and apparatus are disclosed in one embodiment of the present invention to produce a system comprising a databank and a presentation system. A databank may store or be a collection of data such as spatial data, government data, architectural data, sensor data, emergency services data, insurance data, some other data, or the like or combinations or sub-combinations thereof. A presentation system may enable one or more users to interact with the data stored within a databank.

In selected embodiments, a presentation system may enable one or more users to interact with the data in visual and/or auditory ways that correspond to a user-selectable viewpoint. For example, from a particular viewpoint, a virtual scene or image of some portion of the physical world may be rendered by a presentation system. From that viewpoint, a user may be able to quickly assimilate and/or contextualize a large amount of information about the physical world. Should the user need or desire more information about a particular portion of the physical world, the user may zoom in or otherwise change his or her viewpoint of the virtual scene or image in order to take in new or additional information (e.g., new sights, sounds, etc.).

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
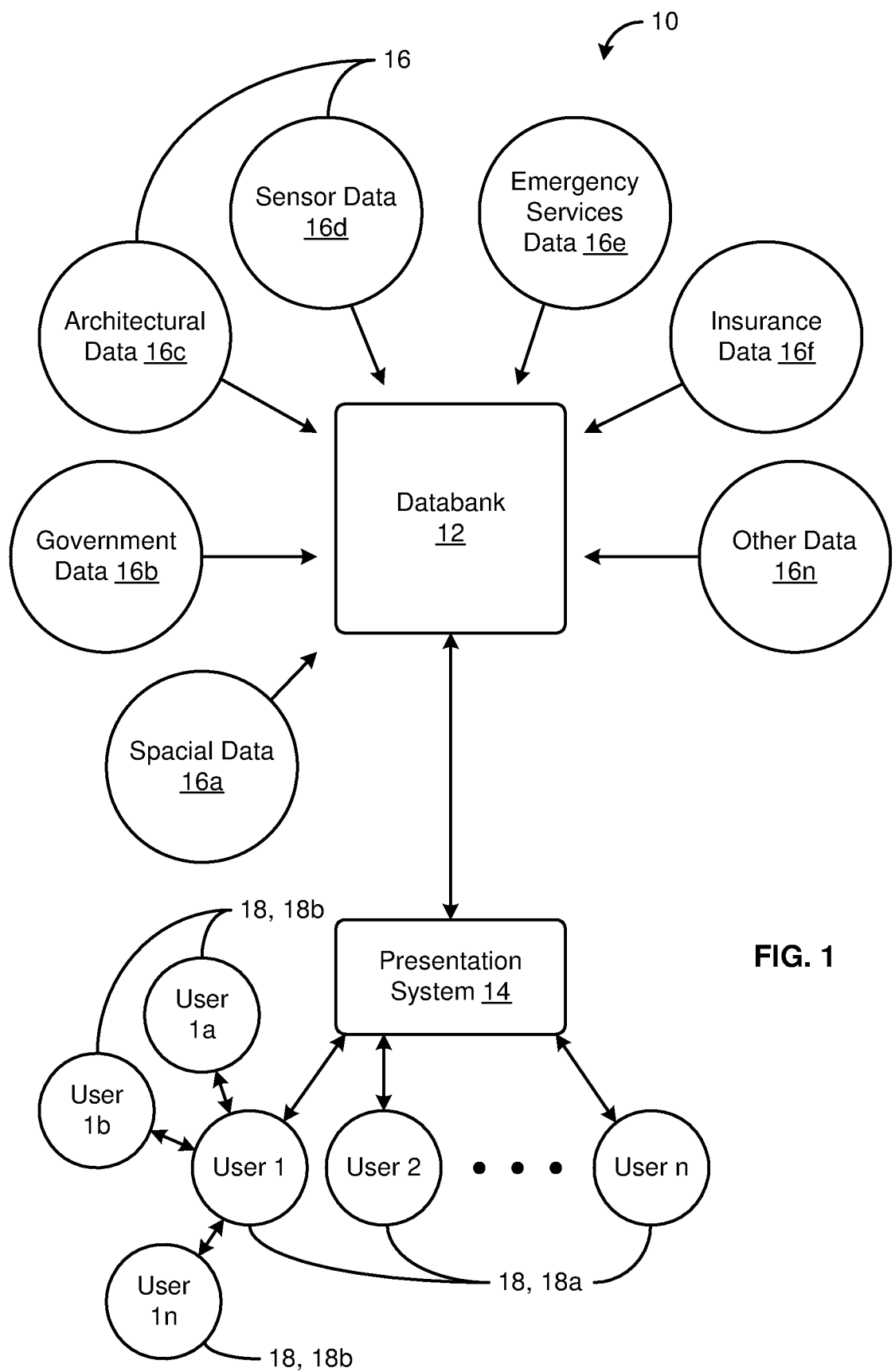
FIG. 1 is a schematic diagram of one embodiment of a system for storing and presenting data in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

In describing selected aspects or components of the present invention, various technical terms may be used. To aid in communicating an appropriate or intended meaning for certain such terms, the following list of terms and corresponding definitions is provided.

Mesh—A mesh is a representation of an object comprising a collection of points in three-dimensional model space that are joined together by lines and known as vertices (vertex being the singular form of vertices) to form multiple polygonal shapes (e.g., triangles or quadrilaterals). Taken together, the multiple polygonal shapes form a surface that simulates or represents the exterior surface of the object. In general, a greater number of points and corresponding higher polygon count may form a finer mesh that more closely or accurately simulates the exterior surface of the object. However, a greater number of points or a higher polygon count may also make a mesh more computationally intensive to render. Accordingly, the granularity of a mesh may be a compromise or balance between the quality of images that can be rendered therefrom and the computational time available for rendering those images.

3D Model—A 3D model is a representation of an object in three-dimensional space. Within the present disclosure, a 3D model may be referred to as a model object or a virtual object. Different modeling processes or schemes may be used to generate or define a 3D model. For example, in certain embodiments, polygonal modeling may be used to generate or define a 3D model. In polygonal modeling, a 3D model may comprise a mesh with one or more surfaces thereof painted and/or textured to improve or complete the visual effect or realism associated therewith. In other embodiments, a 3D model may be generated or defined using curve modeling, digital sculpting, or the like.

3D Model Space—A 3D model space is a three-dimensional space into which one or more 3D models or model objects may be represented or placed. Accordingly, when more than one 3D model is placed within a 3D model space, the 3D models may have relative positions and orientations with respect to one another. A 3D model space may be or define a simulated environment for a presenting spatial data.

Viewpoint—A viewpoint within the present disclosure has the full extent of its ordinary meaning in the field of computer graphics and cameras and specifies a location, direction, and/or orientation. For example, a viewpoint may refer to a single point of view (e.g., for a single eye) or a pair of points of view (e.g., for a pair of eyes). A viewpoint may correlate to or be a perspective. Accordingly, a user viewpoint may be or define a user perspective.

Physical Scene—A physical scene is a view of one or more physical objects, people, or the like from a viewpoint.

Virtual Scene—A virtual scene is a view of one or more 3D models within a 3D model space from a viewpoint.

Render—To render is to use a computer to derive a 2D image capable of being displayed on a display screen (or two 2D images capable of being displayed on a stereo display screen or stereo display device). For example, to render involve using a computer to derive a 2D image from a 3D model space containing one or more 3D models. A rendering process is a process where at least one 2D image is rendered.

Projection—A projection is a 2D representation of a 3D model. To generate a projection, visual perspective and aspect analysis may be used to project a 3D object onto a projection plane. Rendering typically involves generating a projection for each of one or more 3D models located within a viewing frustum. That is, rendering may involve projecting one or more 3D models onto one projection (or render) plane. Typically, a projection plane is located between a near clipping plane and a far clipping plane of a corresponding viewing frustum. In general, a projection plane, a near clipping plane, and a far clipping plane may all be parallel to each other, though in certain projection conditions (e.g. non-normal projections) a projection plane may not be parallel to near and far clipping planes.

Referring to FIG. 1, in selected embodiments, a system 10 in accordance with the present invention may comprise a databank 12 and a presentation system 14. A databank 12 may store or be a collection of data 16 of one or more types and/or from one or more sources. In certain embodiments, a databank 12 may store spatial data 16*a*, government data 16*b*, architectural data 16*c*, sensor data 16*d*, emergency services data 16*e*, insurance data 16*f*, some other data 16*n*, or the like or combinations or sub-combinations thereof.

A presentation system 14 may enable one or more users 18 to interact with the data 16 stored within a databank 12. In selected embodiments, a presentation system 14 may enable users 18 to interact 16 with the data in ways that are natural and intuitive. For example, a presentation system 14 may enable one or more users 18 to interact with the data 16 in visual and/or auditory ways that correspond to a user-selectable viewpoint.

Users 18 are well accustomed to experiencing the physical world around them from particular viewpoints. From a particular viewpoint, a user 18 may be able to quickly assimilate and/or contextualize a large amount of information about the physical world. Should the user 18 need or desire more information about a particular portion of the physical world before him or her, the user 18 may draw nearer to that particular portion or otherwise change his or her viewpoint in order to take in new or additional information (e.g., new sights, sounds, etc.). As a user 18 draws nearer to the particular portion or otherwise moves, the change in his or her viewpoint is typically continuous and gradual. Accordingly, the user is able to maintain within his or her mind a sense of orientation and context wherein a relationship between a later viewpoint and an earlier viewpoint is understood.

In presenting data 16 stored within a databank 12 to one or more users 18, a presentation system 12 may follow or leverage patterns of the physical world. Accordingly, a presentation system 14 may present data visually and/or auditory within a spatial (e.g., geographic) context. Additionally, a presentation system 14 may enable one or more users 18 to draw nearer to a particular portion of the presented data or otherwise change his or her viewpoint in order to take in new or additional information. Moreover, a presentation system 14 may enable one or more users to transition between macro, intermediate, and/or micro viewpoints in a gradual and/or continuous way that prevents the users from becoming disoriented or losing their understanding of how a later viewpoint relates to an earlier viewpoint.

A presentation system 14 may support or enable various users 18 and/or user types. For example, a presentation system 14 may support multiple primary users 18*a*. A primary user 18*a* may be empowered or enabled to initiate a session with a presentation system 14, terminate a session with the presentation system 14, and/or control a viewpoint independent of all other users 18 of the presentation system 14. A secondary user 18*b* may be empowered or enabled to participate in a session with the presentation system 14 with a primary user 18*a* and, potentially, one or more other secondary users 18*b*. During such a session, a secondary user 18*b* may be empowered or enabled to control a viewpoint of the presentation system 14. However, that viewpoint may be shared with (i.e., be the viewpoint seen by) the corresponding primary user 18*a* and any other secondary users 18*b* corresponding to that particular session.

Figure 2:
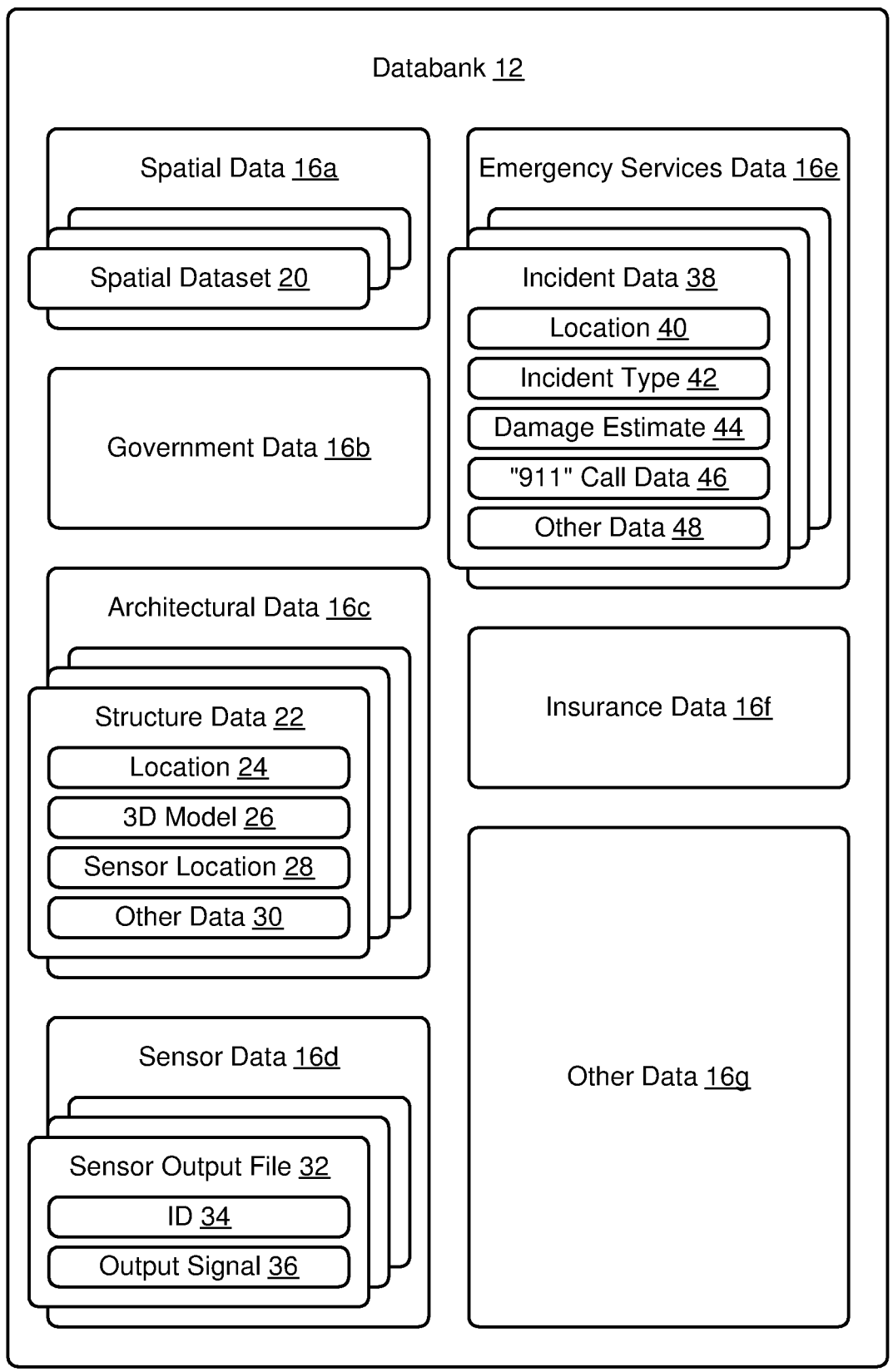
FIG. 2 is a block diagram of one embodiment of a databank in accordance with the present invention.

Referring to FIG. 2, in selected embodiments, a databank 12 may comprise or be supported by one or more memory devices storing data 16. The one or more memory devices corresponding to a databank 12 may be local with respect to a presentation system 14, remote with respect to a presentations system 14, or some combination thereof. For example, in certain embodiments, one or more memory devices corresponding to a databank 12 may support or enable cloud-based storage of certain data 16. Alternatively, a presentation system 14 and one or more memory devices corresponding to a databank 12 and may correspond to a single datacenter or even to a single server.

In certain embodiments, a databank 12 may store spatial data 16*a*. Spatial data 16 may be defined as data and/or information having an implicit or explicit association with a geographic location. For example, population data may be spatial data 16 because it implicitly or explicitly identifies how many humans live within a particular geographic area (e.g., within a particular building, city block, neighborhood, city, county, region, state, nation, continent, etc.).

Spatial data 16*a* stored within a databank 12 may comprise one or more datasets 20. Each dataset 20 may be independent of all other datasets 20 in terms of the type of data, geographic area, or the like. For example, one dataset 20 may correspond to population, while another dataset 20 may correspond to crop production. Alternatively, one dataset 20 may corresponding to a first geographic area (e.g., population data corresponding to a first county), while another dataset 20 may corresponding to a second geographic area (e.g., population data corresponding to a second county). Accordingly, spatial data 16*a* may comprise a collection of one or more datasets 20 of interest or potential interest to one or more users 18.

Each dataset 20 may have a resolution associated therewith. For example, a dataset 20 relating to population may have a nation-level resolution. Accordingly, the dataset 20 may identify how many people live within each nation of a particular continent, but not identify where the people live within those nations. Such a dataset 20 may be said to have a relatively low resolution and be, therefore, of lesser utility. Conversely, a dataset 20 may have a city-block-level resolution. Accordingly, the dataset 20 may identify how many people live within each block (or other relatively small geographic area) of a particular city. Such a dataset 20 may be said to have a relatively high resolution and be, therefore, of higher utility.

In general, the datasets 20 within a databank 12 may be selected to have a desired subject matter, resolution, geographic scope, etc. to meet the needs of the users 18 of a system 10. Accordingly, when preparing a databank 12 for use, a user 18, technician, information technology specialist, or the like may select, download, and/or install one or more appropriate datasets 20. For example, if a presentation system 14 were to be used to visualize wild fire hazards or to plan wild fire response strategies within a particular county, a user 18, technician, information technology specialist, or the like may obtain (e.g., from one or more public or private entities) a population dataset 20 for the county, biomass dataset 20 for the county, man-made structures dataset 20 (e.g., property values dataset 20) for the county, historic wild fire dataset 20 for the county, or the like or a combination or sub-combination thereof. Thus, multiple datasets 20 may be obtained to provide a useful collection of spatial data 16*a*.

In selected embodiments, a presentation system 14 may be or comprise a geographic information system (GIS). For example, a presentation system 14 may include and/or leverage QGIS, a free and open source geographic information system. Accordingly, in selected embodiments, one or more datasets 20 of a databank 12 may be in a format that is compatible with QGIS or some other GIS.

Certain data 16 may have an implicit or explicit association with a geographic location, yet not be initially available in a format that is compatible with QGIS, some other GIS, or a presentation system 14. Accordingly, in selected embodiments, certain data 16 may be processed (e.g., preprocessed) by a presentation system 14 or some other computer system in order to convert it to a format that is ready for presentation within the presentation system 14. For example, a presentation system 14 or some other computer system may use address information (e.g., street address, city, state, zip code, or the like or combinations or sub-combinations thereof) within selected data to determine coordinates (e.g., latitude and longitude) within a coordinate system that is compatible with a presentation system 14. Accordingly, data 16 that is obtained from one or more public or private entities in a form that is incompatible with a system 10 in accordance with the present invention may be converted into a compatible form.

In selected embodiments, a databank 12 may contain government data 16*b*. Government data 16*b* may be any data that is collected, distributed, or the like by a government entity, agency, contractor, or the like. In selected embodiments, certain government data 16*b* may have an implicit or explicit association with a geographic location. Accordingly, government data 16*b* may be a type of spatial data 16*a* (e.g., a more raw or unprocessed spatial data 16*a* that is not made available by a government entity in a form that is compatible with QGIS, some other GIS, or the like).

In certain embodiments, a databank 12 may contain architectural data 16*c*. Architectural data 16*c* may be any data that describes or characterizes a building, structure, or the like. Architectural data 16*c* may include structure data 22 corresponding to one or more physical buildings. The structure data 22 for a particular physical building may include: (1) location data 24 that links the building or structure to a particular geographic location and/or orientation; (2) 3D model data 26 that enables a presentation system 14 to render a virtual image (e.g., a computer generated 2D image) of the building, the structure, relative locations of building components, and/or the internals (e.g., floors) thereof from a viewpoint (e.g., a viewpoint selected by a user 18); (3) sensor location data 28 that identifies a location of one or more sensors within the building, structure, or the like; (4) other data 30 as desired or necessary, or the like or a combination or sub-combination thereof.

In selected embodiments, a databank 12 may contain sensor data 16*d*. Sensor data 16*d* may be any data that describes or characterizes an output of a sensor. For example, sensor data 16*d* may comprise one or more sensor output files 32. Each such file 32 may include identification information 34 and output signal 36 (e.g., digital signal) covering a selected period of time. The identification information may link the corresponding output signal to a particular physical sensor.

That is, a physical building may contain one or more sensors (e.g., earthquake sensors, fire sensors, motion sensors, and/or environmental or temperature sensors). Structure data 22 corresponding to that physical building may include 3D or 2D sensor location data 28 indentifying locations of the one or more sensors within the physical building. Accordingly, a presentation system 14 may render a virtual image (e.g., a computer generated 2D image) of the physical building and show where the one or more sensors are located. Moreover, the sensor data 16*b* may comprise one or more sensor output files 32 storing signal 36 output by the one or more sensors in the physical building over a selected period of time. The identification information 34 may identify which output signal 36 corresponding to which sensor in the physical building. Accordingly, when a presentation system 14 presents a virtual image of the building to a user 18, the user may select a particular sensor depicted in that virtual image and interact with (e.g., see, listen to, etc.) signal output by the real world version of that particular sensor.

In certain embodiments, a databank 12 may contain emergency services data 16e. Emergency services data 16e may be any data that describes or characterizes one or more instances where emergency services were deployed (e.g., deployed within a particular geographic area). Emergency services data 16e may include real time, recent, or historical incident data 38 corresponding to one or more emergencies or deployments of emergency services personnel or resources. The incident data 38 for a particular emergency or deployment may include: (1) location data 40 that links the emergency or deployment to a particular geographic location; (2) incident type data 42 that categories the emergency or deployment (e.g., fire, car accident, crime, burglary, assault, domestic violence, shooting, etc.); (3) damage data 44 (damage estimates, damage claims, real damages, or the like) quantifying (e.g., via a dollar amount) an amount of damage caused by or corresponding to the incident; (4) 911 call data 46 (e.g., one or more audio recordings) characterizing one or more telephone calls made to emergency services to report the incident; (5) other data 30 as desired or necessary, or the like or a combination or sub-combination thereof.

In selected embodiments, a databank 12 may contain insurance data 16f. Insurance data 16f may be any data that is collected, distributed, or the like by insurance agencies, trade organizations, government entities or agencies, or the like that characterized, describe, or quantify insurance claims, insurance payouts, or the like. In certain embodiments, selected insurance data 16f may have an implicit or explicit association with a geographic location (e.g., a home address, an address to which a vehicle is registered, a location of a car accident, or the like). Accordingly, insurance data 16f may be a type of spatial data 16a (e.g., a more raw or unprocessed spatial data 16a that is not made available by a insurance agency, trade organization, government entity or agency, or the like in a form that is compatible with QGIS, some other GIS, or the like).

In certain embodiments, a databank 12 may contain other data 16g that is different from or an extension of the types of data 16a, 16b, 16c, 16d, 16e, 16f discussed hereinabove. Accordingly, the types of data 16a, 16b, 16c, 16d, 16e, 16f discussed hereinabove are provided by way of example and are not to be construed as limiting a databank 12 to storing only those types data 16.

Figure 3:
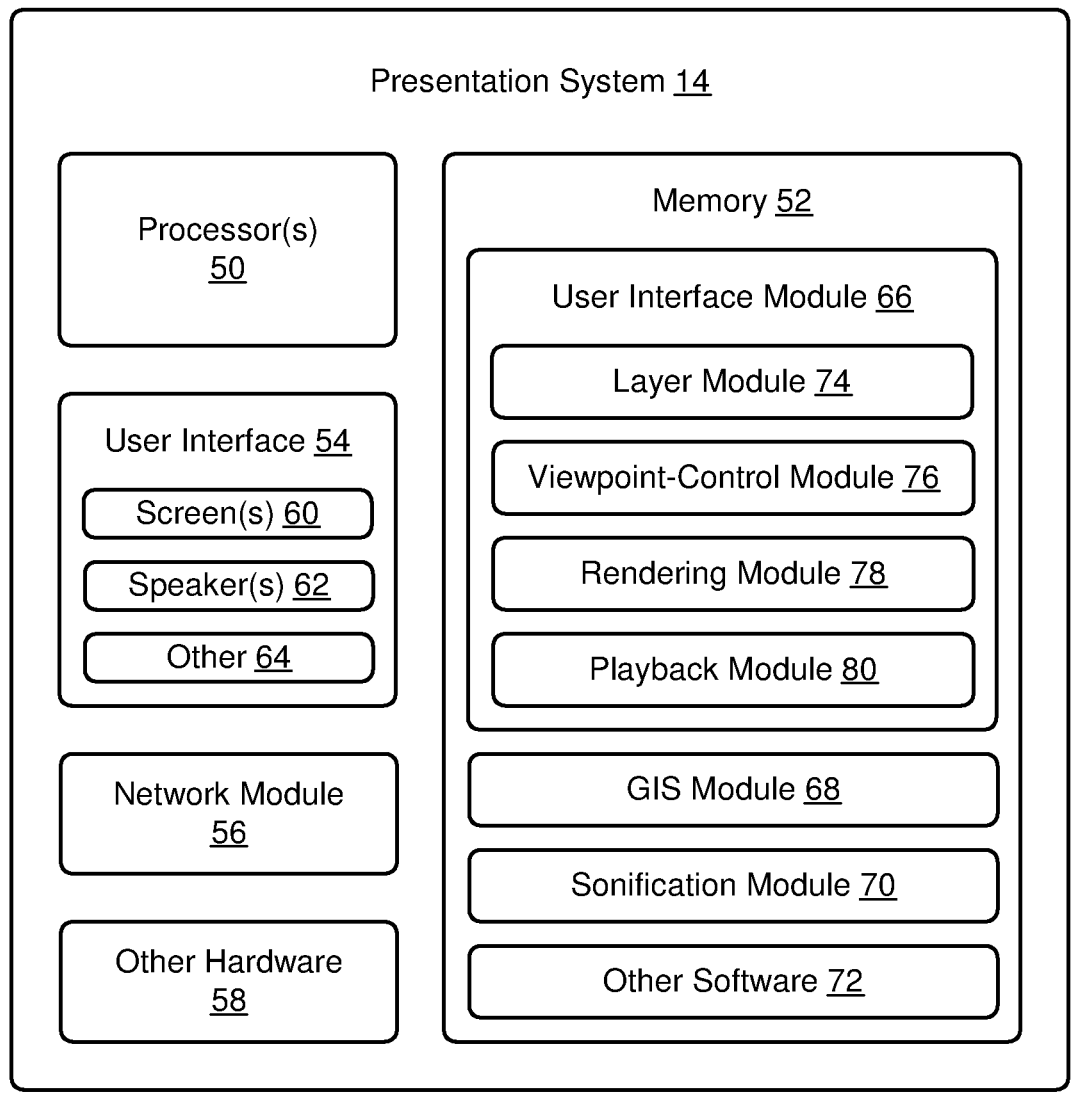
FIG. 3 is a block diagram of one embodiment of a presentation system in accordance with the present invention.

Referring to FIG. 3, a presentation system 14 in accordance with the present invention may operate in any suitable manner to control processing and/or presentation of data 16 stored within a databank 12. For example, a presentation system 14 may be embodied as hardware, software, or some combination thereof.

In selected embodiments, a presentation system 14 may include computer hardware and computer software. The computer hardware of a presentation system 14 may include one or more processors 50, memory 52, one or more user interfaces 54, a network module 56, other hardware 58 as desired or necessary, and the like or a combination or sub-combination thereof. In certain embodiments, all or some subset of this computer hardware may be hardware already included as part of a computer workstation, personal computer, or the like. For example, all or some portion of the computer hardware may be multipurpose and perform tasks that are already associated with the operation of a personal computer. Alternatively, a presentation system 14 may be dedicated substantially exclusively to functioning in accordance with the present invention.

In certain embodiments, a presentation system 14 may be or support a distributed computing environment or arrangement. Accordingly, a presentation system 14 may comprise multiple computing devices that are connected via a computer network in a server-client relationship, peer-to-peer relationship, or some combination or hybrid thereof. In selected embodiments, a presentation system 14 in accordance with the present invention may create audiovisual content for users 18 of a system 10 in accordance with the present invention.

Memory 52 (e.g., non-transitory computer-readable media) associated with a presentation system 14 in accordance with the present invention may be operably connected to the one or more processors 50 and store the computer software (e.g., store the computer software as a computer-program product). This may enable the one or more processors 50 to execute the computer software. Memory 52 in the context of the present invention may include RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium which can be used to store desired program code in the form of computer-executable instructions or data structures and which can be accessed by a general purpose or special purpose computer.

A user interface 54 of a presentation system 14 may enable one or more users 18 of one or more types (e.g., data analysts, scientists, engineers, policy makers, information technology specialist, or the like) to interact with, run, customize, or control various aspects of a presentation system 14. A user interface 54 may enable a user 18 to manually control (e.g., select, type in, incrementally increase or decrease at the touch of a button or twist of a knob) and/or orally control (e.g., issue one or more commands or requests using his or her voice) one or more operations of a presentation system 14. In selected embodiments, a user interface 54 of a presentation system 14 may include one or more display screens 60, buttons, switches, knobs, keypads, keyboards, game controllers, touch screens, pointing devices, microphones, speakers 62, some other input and/or output device 64, and the like or a combination or sub-combination thereof.

A network module 56 may enable a presentation system 14 in accordance with the present invention to communicate with one or more other computer systems. For example, a network module 56 may enable a presentation system 14 in accordance with the present invention to communicate with or access data 16 stored within a databank 12. In this manner, data 16 stored within a databank 12 (e.g., a databank 12 located remotely with respect to a presentation system 14) may form the basis of visual and/or auditory content presented by a presentation system 14 to one or more users 18.

In selected embodiments, memory 52 associated with a presentation system 14 may store (at least temporarily) a user interface module 66, a GIS 68 (e.g., QGIS), a sonification module 70, other data or software modules 72 as desired or necessary, and the like or a combination or sub-combination thereof. A user interface module 66 may enable one or more users 18 of a presentation system 14 to control the various aspects or functions thereof. In certain embodiments, a user interface module 74 may comprise a layer module 74, viewpoint-control module 76, render module 78, playback module 80, and the like, or a combination or sub-combination thereof.

A layer module 74 may enable a user 18 to control which of a plurality of layers are presented by a presentation system 14 to the user 18 at a particular moment in time. For example, for a particular viewpoint selected by a user 18, a presentation system 14 may present a view (e.g., a macro, intermediate, or micro view) of a plurality of geographic features. The plurality of geographic features may include elevation contours, hills, mountains, valleys, streams, rivers, lakes, beaches, other topographical or natural features as desired or necessary, or the like or a combination or sub-combination thereof. Alternatively, or in addition thereto, the plurality of geographical features may include one or more roads, buildings, or other man-made structures. For a particular viewpoint selected by a user 18, a presentation system 14 may present a list of one or more layers that may be applied (e.g., applied as overlays) to the plurality of geographic features. Accordingly, a user 18 may select which of the one or more layers are to be applied or visible at a particular time.

The natures of the plurality of layers may vary between different embodiments, viewing contexts, users 18, viewing sessions, etc. For example, the layers available for a macro (e.g., satellite based) view of a city or neighborhood may be different from the layers available for a micro (e.g., zoomed-in, close-up, or building-focused) view of interior features of a building or other man-made structure within that city or neighborhood. Accordingly, as a user 18 controls or changes a point of view, a layer module 74 may change which layers are available for selection or application to a current view.

Each layer supported or provided by a layer module 74 may comprise or correspond to different data contained within a databank 12. For example, a first layer may correspond to human occupancy (e.g., a count of persons corresponding to a particular location or area at a particular time or some relative indicator or indicators conveying a density or relative density of people or types of people such police officers, fire department personnel, doctors, pedestrians, or the like), while a second layer may correspond to vehicle counts (e.g., a count of vehicles passing a particular location within a particular period of time or some relative indicator or indicators conveying a density or relative density of ground or air vehicles or vehicle types such as police vehicles, fire vehicles, large trucks, cars, or the like). Accordingly, if a user 18 wants to see a visual representation of spatial human occupancy data, the user 18 may select the first layer. If a user 18 wants to see a visual representation of spatial traffic data, the user 18 may select the second layer. If a user 18 wants to simultaneously see a visual representation of spatial human occupancy data and spatial traffic data, the user 18 may select both the first layer and the second layer.

A viewpoint-control module 76 may enable one or more users 18 to select and change a viewpoint of the plurality of geographic features that is presented to the one or more users 18. In selected embodiments, a viewpoint-control module 76 may enable or support zoom, rotate, and pan functionality or the like or a combination or sub-combination thereof. Accordingly, if a current view being presented by a presentation system 14 is a macro or "satellite" view of a city or neighborhood and a user 18 would like to see a particular feature such as a building in greater detail, then a viewpoint-control module 76 may enable the user 18 to zoom in on the feature, rotate to a different side of the feature, pan to an adjacent feature, zoom back out, and the like or a combination or sub-combination thereof as desired or necessary.

A rendering module 78 may receive or operate on one or more 3D models 26, photographic data, map data (e.g., GIS data), or the like or combinations or sub-combinations thereof and output one or more 2D images. The 2D images may depict a plurality of geographic features from a viewpoint selected by a user 18. For example, a rendering module 78 may use satellite images, aerial images, and/or GIS data or a model space built therefrom to create 2D images of a plurality of geographic features from a viewpoint selected by a user 18. Alternatively, or in addition thereto, a rendering module 78 may use 3D models 26 of specific objects (e.g., one or more man-made structures) to create 2D projection renderings of those objects from a viewpoint selected by a user 18.

In selected embodiments, a rendering module 78 may operate on a 3D model space. A 3D model space may have one or more 3D models 26 of specific objects (e.g., one or more buildings) and 3D or 2D models of geographic region. When multiple 3D models 26 of specific objects are placed within a 3D model space, the 3D models 26 may have relative positions and orientations with respect to one another and with respect to the 3D or 2D models of geographic region. Accordingly, when a viewpoint is selected in a 3D model space, one or more 3D models 26, one or more 3D or 2D models of a geographic region, and the like within the 3D model space may have relative positions and orientations with respect to the viewpoint and a virtual scene may be created. Accordingly, in a rendering process, a viewpoint may be selected, a projection rendering may be made, and a 2D image capturing the virtual scene may be generated. The 2D image may simulate how an eye, camera, or the like at the viewpoint would perceive the one or more geographic regions and the specific objects therein.

In order to integrate one or more 3D models 26 into a 3D or 2D model of a geographic region, a presentation system 14 may work with and/or transition seamlessly between more than one coordinate system or between more than one presentation mode. For example, a 3D or 2D model of a geographic region may be defined in terms of latitude, longitude, and elevation. One or more structures (or the locations of one or more sensors contained therewithin), on the other hand, may be defined in terms of orthogonal x, y, and z measures with respect to an origin point. Accordingly, a presentation system 14 (e.g., a rendering module 78 or a 3D model space used by a rendering module 78) may enable one or more 3D models 26 defining structures or components thereof in terms of orthogonal x, y, and z measures to be properly located and oriented in 3D or 2D model of a geographic region defined in terms of latitude, longitude, and elevation. This may avoid any necessity of converting all aspects of a 3D model space to a shared or common coordinate system. Additionally, it may enable a presentation system 14 to provide continuity (e.g., continuous and gradual changes in viewpoint) as a user 18 zooms in or out or otherwise changes his or her viewpoint. Accordingly, the user may maintain within his or her mind a sense of orientation and context wherein a relationship between a later viewpoint and an earlier viewpoint is understood.

In certain embodiments, a presentation system 14 may selectively transition (e.g., transition in accordance with the selections of one or more users 18) between a "GIS mode" and an "object mode." In a GIS mode, a default coordinate system may be related to global positioning allowing for a satellite view. A GIS mode may be powered, enabled, or supported by a GIS module 68. In an object mode, a default coordinate system may be focused on a specific object (e.g., a particular building) and be a level deeper in immersion from what is provided in a GIS mode. A object mode may be powered, enabled, or supported by a rendering module 78.

In certain embodiments, data (e.g., the data contained in one or more layers or overlays) presented by a presentation system 14 may change with time. Accordingly, a playback module 80 may enable a user 18 to "play" data corresponding to a particular period of time and see how the data changes with time. In selected embodiments, a playback module 80 may support a scrubbing function. That is, the playback module 80 may enable a user 18 to selectively move a cursor or playhead backward or forward across a timeline in order to control what portion of the data to play, replay, etc. Alternative, or in addition thereto, a playback module 80 may utilize key frames that may be tied to certain events or moments in time and scrubbing may be preformed based on a user 18 choosing key events to scrub between.

A GIS module 68 may provide, enable, or support a framework for capturing, analyzing, and visualizing spatial data. In certain embodiments, a GIS module 68 may support the operation of a layer module 74, rendering module 78, or the like or a combination thereof. In selected embodiments, a GIS module 68 may be, include, and/or leverage QGIS, a free and open source geographic information system. In other embodiments, a GIS module 68 may be, include, and/or leverage some other GIS.

A sonification module 70 may enable data (e.g., output signal 36 from one or more sensors) that is not inherently auditory in nature to be heard by one or more users 18. For example, segments of accelerometer data output by one or more earthquake sensors may be converted by sonification module 70 into audio files that may be played for a user 18. Accordingly, when interacting with a presentation system 14 in accordance with the present invention, a user 18 may hear the accelerations that are experienced by a building or other structure during an earthquake. This may enable one or more users 18 to assimilate data without having to read or visually interpret that data. In selected embodiments, a playback module 80 may enable one or more users 18 to play, scrub, replay, etc. one or more audio files generated by a sonification module 70.

Figure 4:
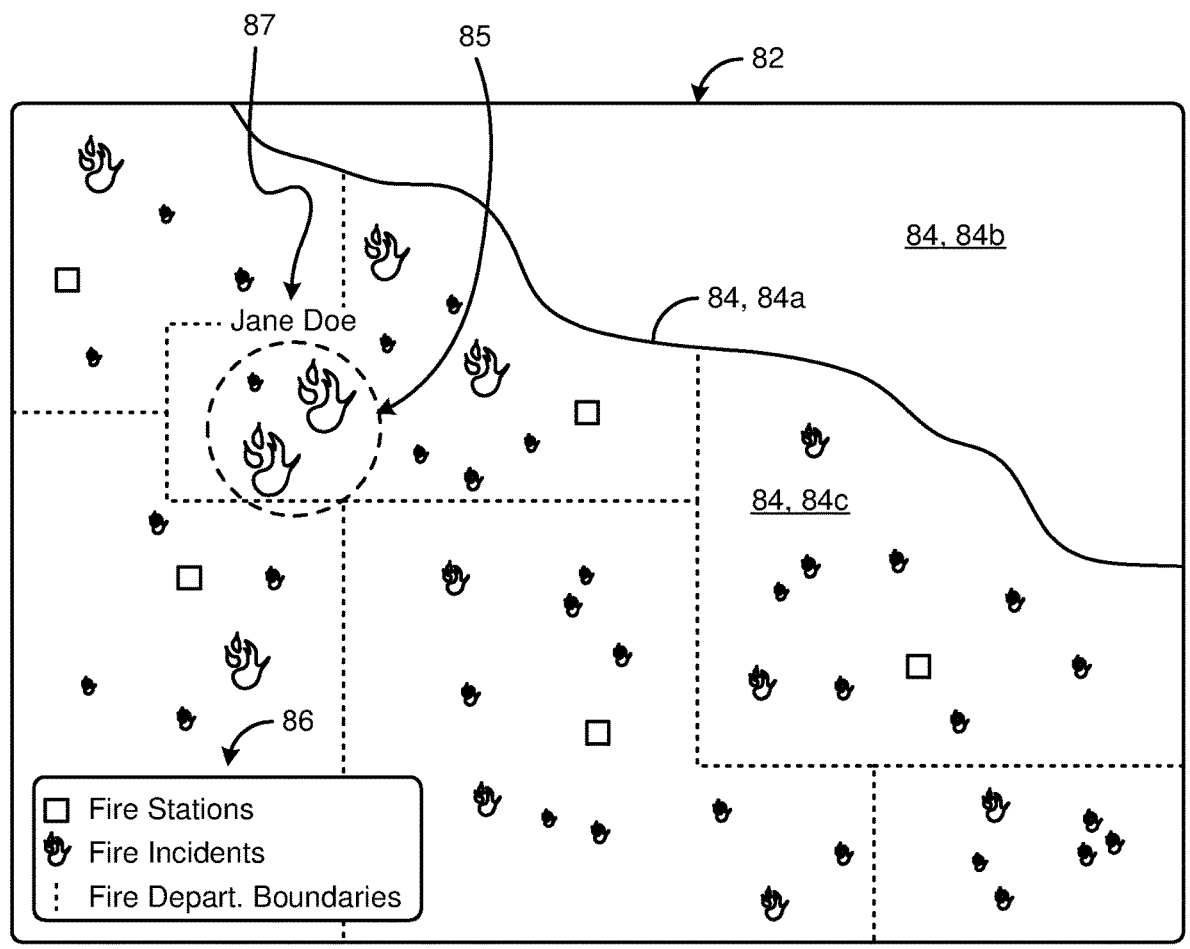
FIG. 4 is one example of a macro view of spatial data that may be produced and presented by a presentation system in accordance with the present invention.

Referring to FIG. 4, 2D images 82 presented by a presentation system 14 may have any suitable arrangement or format. In selected embodiments, the 2D images 82 may be generally rectangular and present, depending on a viewpoint selected by a user 18, a macro, intermediate, or micro view of one or more geographical features 84. For example, in the illustrated image 82, a presentation system 14 is presenting a macro view of a city or some portion of a city. The macro view may be a zoomed out or "satellite" view. Zooming out further may enable a user 18 to see more of the city or of the surrounding cities. Zooming in may enable a user 18 to get a better view of a particular portion of the city.

In the illustrated image 82, a first geographical feature 84*a* may be a coast line, a second geographical feature 84*b* may be a body of water (e.g., an ocean or lake), and a third geographical feature 84*c* may be a land mass. Other geographical features 84 may be man-made structures like fire stations that exist in the physical world, which are represented by small squares in the illustrated image 82. Still other geographical features 84 may be intangible features such as human-designated boundaries between different fire departments, which are represented as dotted lines in the illustrated image 82. Still other geographical features 84 may be locations where certain events such a fires incidents occurred or are occurring, which are represented by schematic symbols. All such features 84 may be defined, positioned, and/or illustrated (e.g., symbolized) according to one or more files or data stored within a databank 12. For example, one or more spatial datasets 20, government data 16*b*, incident data 38, and/or insurance data 16*f* may indicate or define the locations of the coast line, body of water, land mass, fire stations, boundaries between different fire departments, and/or locations where fires incidents occurred or are occurring and indicate what symbols, markings, or the like are to represent those features.

In the illustrated image 82, a key 86 lists three layers, namely, a fire station layer, a fire incident layer, and a fire department boundaries layer. All three layers are "checked," highlighted, or otherwise selected so as to be visible in the image 82. As shown, the schematic symbols that indicate locations of fire incidents may have different sizes. In general, the larger the size of the schematic symbol, the larger the fire incident. In selected embodiments, such size may be measured or quantified by an estimate of property damage. In other embodiments, such size may be measured or quantified by how many fire department resources (e.g., personnel, trucks, and/or the like) were or are currently deployed. Thus, depending on the nature of the data being presented, the illustrated image 82 may be historical and permit users to visual incidents in that occurred in the past (e.g., in the past decade, year, month, day, or other time period selected by a user 18) or current and permit users to visualize in near real time what is presently happening.

In selected embodiments, selecting a schematic symbol may enable a user 18 to see data (e.g., textual data) corresponding to the particular incident or the like represented by the schematic symbol. For example, by selecting or clicking on a fire station symbol, a user 18 may see or read how many people work at that station, how many people are currently on duty at that station, which emergency response vehicles are assigned to or current at the stations, or the like or a combination or sub-combination thereof. Alternatively, by selecting or clicking on a fire symbol, a user 18 may see or read an estimated damage associated with the fire, how many fire fighting personnel are or were working the fire, which emergency response vehicles are or were at the fire, or the like or a combination or sub-combination thereof.

In certain embodiments, 2D images 82 presented by a presentation system 14 may enable a user 18 to see a current area of focus of one or more other users 18. This may facilitate coordination, cooperation, division of labor, or the like within teams of users 18. For example, in the illustrated image 82, a dashed circle 85 and associated text 87 identifies an area currently being viewed by a particular user 18 and the name of that user 18. Accordingly, a user 18 presented with the illustrated image 82 may easily see that Jane Doe is zoomed in on a northwest portion of the city that had (or is currently experiencing) two relatively large fire incidents.

In selected embodiments, a presentation system 14 (e.g., a user interface module 66) may enable a user 18 to select a resolution associated with an illustrated image 82. Higher resolution images 82 may be more computationally intensive, use more battery power, require more network bandwidth, or the like. In certain situations, the higher demands associated with higher resolution images 82 may exceed available resources. Accordingly, in such situations, a user 18 may selectively lower a resolution associated with an illustrated image 82 in order to preserve or utilize a limited resource (e.g., a poor or slow Internet connection, a computing device with a low battery, etc.).

The number and variations of spatial data 16a that may be presented by a presentation system 14 in accordance with the present invention is substantially unlimited. Accordingly, the image 82 illustrated in FIG. 4 is just one example of what a 2D image 82 created by a presentations system 14 may look like and/or contain.

Figure 5:
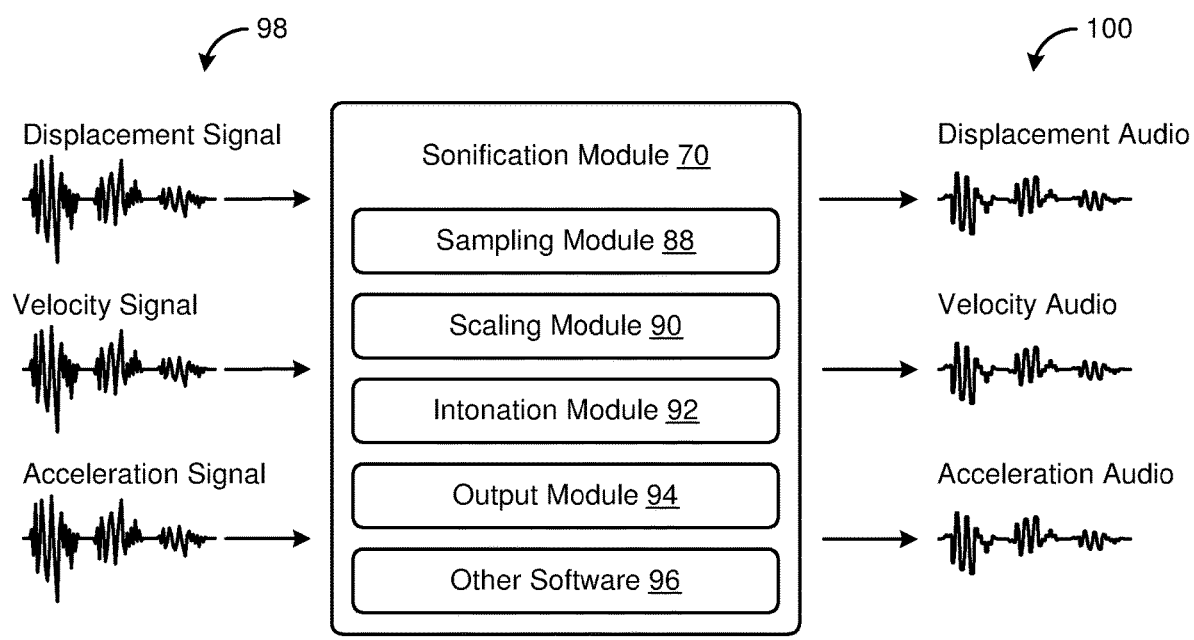
FIG. 5 is a block diagram of one embodiment of a sonification module in accordance with the present invention.

Referring to FIG. 5, in selected embodiments, a sonification module 70 may include a sampling module 88, scaling module 90, intonation module 92, output module 94, other software 96, or the like or a combination or sub-combination thereof. A sampling module 88 may reduce a continuous-time signal to a discrete-time signal. For example, in certain embodiments, an input signal 98 (e.g., a signal segment, signal stream, or the like) received by a sonification module 70 may be an analog signal and a sampling module 88 may collect a series of samples that enable the analog signal to be digitally represented (i.e., that convert the analog signal into a digital signal or into digital data).

A scaling module 90 may scale a signal so that the peak amplitude or the like does not extend beyond a specific value or outside of a particular range. That specific value or particular range may ensure that when the scaled signal is processed by an intonation module 92, the resulting ranges of tone frequencies fall within appropriate audible bands (e.g., human sensible frequencies or within audible frequencies typically heard by humans). In other words, a scaling module 90 may ensure that an intonation module 92 does not intone the extremes of the signal with frequencies that are too low or too high to be properly and/or comfortably heard by one or more users 18 (e.g., ensure that the resulting frequencies fall within a frequency range of about 20 Hz to about 20 KHz). In certain embodiments, scaling performed by a scaling module 90 may include multiplying amplitude values (e.g., all amplitude values corresponding to one or more signals) by a constant that is less than one and greater than zero.

Alternatively, or in addition thereto, a scaling module 90 may elongate (slow down) or contract (speed up) a signal. That is, certain events and the signal characterizing those events may be densely packed and/or occur in a relative short period of time. Other events and the signal characterizing those events may be sparsely packed and/or occur in a relative long period of time. Accordingly, a scaling module 90 may elongate or contract a signal with respect to time so that, after being processed by an intonation module 92, the signal may more readily be experienced or comprehended by one or more users 18.

In selected embodiments, a most extreme signal or set of data may be used to determine what may be an appropriate scaling for a particular situation. For example, the maximum amplitude for signal output by an earthquake sensor located on a ground level of a building may be very different from (e.g., much less than) the maximum amplitude for signal output by an earthquake sensor located on a top floor of that building. Accordingly, the signal or data corresponding to the earthquake sensor located on the top floor may be used to determine the appropriate scaling.

An intonation module 92 may intone a signal segment, signal stream, data, or the like so that variations (e.g., oscillations, spikes, drops, etc.) in that signal or data may be audibly communicated to or experienced by one or more users 18 via matching or corresponding variations (e.g., corresponding oscillations, spikes, drops, etc.) in tone frequency in an output signal. In selected embodiments, an intonation module 92 may intone different types of signals with different tones. This may enable a user 18 to hear different types of signals at the same time.

For example, one or more earthquake sensors may produce or output displacement signals, velocity signals, and/or acceleration signals. An intonation module 92 may apply a different tone to each such type of signal. In certain embodiments, the different tones may be audibly distinctive and yet be audibly compatible. Accordingly, if intoned versions of a displacement signal, velocity signal, and acceleration signal were synchronously heard by a user 18, the user 18 may be able to differentiate the three tones and perceive the nuances therein.

An output module 94 may generate one or more audio files 100. An audio file 100 may be a version of an intoned signal that has been converted into a format suitable for being recognized and played by audio software or by an audio system. In selected embodiments, an output module 94 may generate different audio files 100 for different types of signals. For example, one or more earthquake sensors may produce or output displacement signals, velocity signals, and/or acceleration signals. Accordingly, after each signal type has been processed (e.g., sampled and/or scaled), intoned, or the like, an output module 94 may produce displacement audio files 100, velocity audio files 100, and/or acceleration audio files 100. This may enable each of the various audio files 100 to be played, scrubbed, etc. alone or in any desired combination with one or more other audio files 100.

Figure 6:
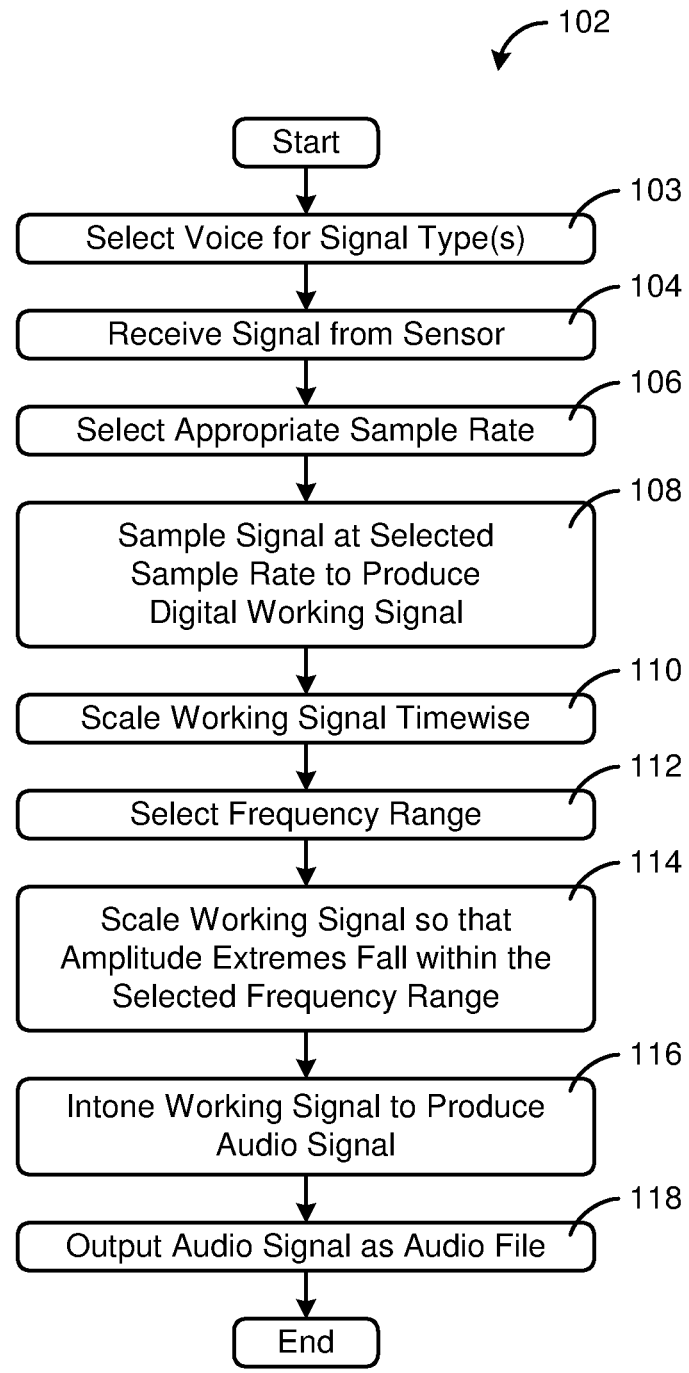
FIG. 6 is a block diagram of one embodiment of a method for converting signal from a sensor into an audio signal in accordance with the present invention.

Referring to FIG. 6, a sonification method 102 in accordance with the present invention may include, begin with, or be preceded by selecting 103 a voice for one or more signal or types. In certain embodiments, such selecting 103 may be at least partially performed by a human because deciding what would be an appropriate voice or timbre for a particular signal 98 may be subjective and/or benefit from the ear and judgment of an experienced sound professional. Accordingly, selecting 103 a voice may include determining or identifying a type for an input signal 98 and then identifying which voice or timbre has been assigned (e.g., by a human) to that particular type of input signal 98.

A sonification method 102 in accordance with the present invention may include receiving 104 an input signal 98. In selected embodiments, the input signal 98 may originate with (e.g., be output by) a physical sensor operating in the physical world. A sonification method 102 may occur in real time as a physical sensor generates an input signal 98. Alternatively, a sonification method 102 may occur after the fact (e.g., after the signal 98 has been stored within a databank 12). Depending on the characteristics of an input signal 98, a sonification method 102 may include selecting 106 an appropriate sampling rate and sampling 108 the input signal 98 at that rate to produce a digital working signal. If an input signal 98 is received or already stored within databank 12 as a digital signal, such sampling and the analog to digital conversion produced thereby may be omitted.

In selected embodiments, a working signal may be scaled 110 timewise. That is, a working signal may be expanded or contracted with respect to time so that the end result is better suited for presentation to a user 18. For example, signal corresponding to the output of an earthquake sensor during an earthquake may be relatively densely packed with respect to time. That is, a significant amount of seismic activity may be occur in a relatively short period of time. Accordingly, signal characterizing such activity may be expanded (i.e., slowed down) so that the finer details thereof may be audibly perceived by a user 18.

A sonification method 102 may include selecting 112 a frequency range for an audio file 100. Certain frequencies of audio waves are difficult or impossible for humans to hear or are outside of an appropriate audible band. Accordingly, a frequency range may be selected 112 so that all of the sound of an audio file 100 falls within an appropriate audible band. Once a frequency range is selected 112, a working signal may be scaled 114 so that a peak amplitude and/or the amplitude extremes thereof fall within the selected frequency range.

Once a working signal has been appropriately processed (e.g., sampled 108, scaled timewise 110, scaled amplitudewise 114, or the like), it may be intoned 116 in order to product an audio signal. For example, intoning 116 may include a MIDI conversion (e.g., a MIDI to frequency conversion). In selected embodiment, intoning may include varying a pitch of an oscillator according to changes in the amplitude of the working signal. Thus, the greater the amplitude for a particular segment of the working signal, the higher the pitch for the tone represented that segment in the audio signal.

In other embodiments, intoning 116 may include varying a volume of a tone according to changes in the amplitude of the working signal. Thus, the greater the amplitude (e.g., the farther away from a zero or neural amplitude) for a particular segment of the working signal, the higher the volume for the tone represented that segment in the audio signal.

Regardless of the particular methodology employed, intonating 116 may enable a user 18 to hear the various and/or nuances of a working signal. Once an audio signal is produced, it may be formatted or otherwise output 118 as an audio file.

Figure 7:
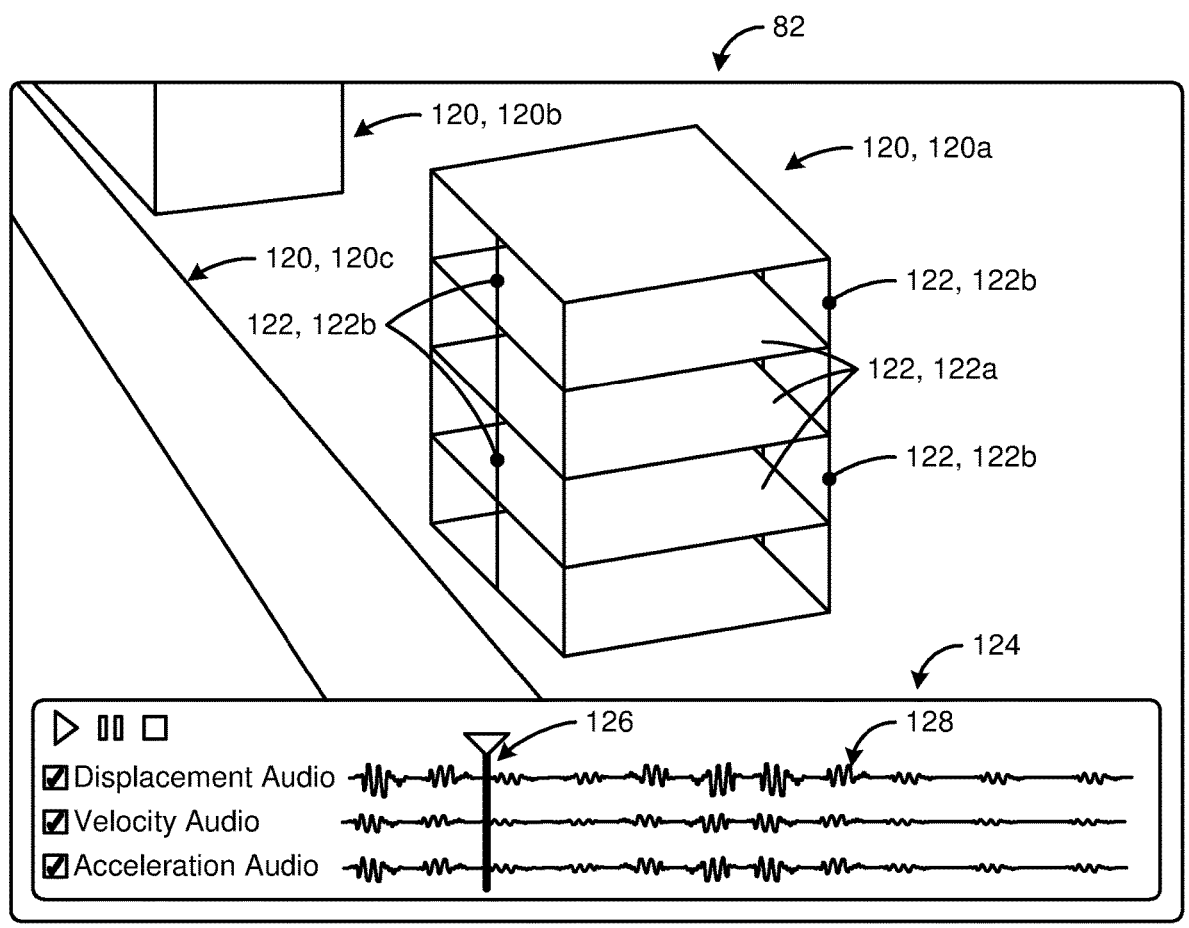
FIG. 7 is one example of a micro view of spatial data that may be produced and presented by a presentation system in accordance with the present invention, the micro view being accompanied by a user interface with a scrubbing feature that enables a user of the presentation system to selectively and/or repeatedly interact with the spatial data as it changes over a selected period of time.

Referring to FIG. 7, as noted above, 2D images 82 presented by a presentation system 14 may have any suitable arrangement or format. For example, in the illustrated image 82, a presentation system 14 is presenting a micro view of a specific portion of a city and one or more structures 120 corresponding thereto. The micro view may be a zoomed in or "close-up" view of a structure 120a (e.g., a particular building 120a). Zooming out further may enable a user 18 to see more of the city or of the surrounding structures 120 (e.g., surrounding buildings 120b, streets 120c, or the like). Zooming in may enable a user 18 to get a better view of a particular portion of the structure 120a.

In the illustrated image 82, a structure 120a is shown in a semi-transparent mode, cross-section mode, or the like or some combination thereof. This may enable a user 18 to see certain exterior features of the structure 120a (e.g., its location, overall size and shape, etc.) and certain interior features 122 of the structure 120a. Such interior features 122 may include one or more floors 122a, one or more sensors 122b (e.g., earthquake sensors), and the like or a combination or sub-combination thereof. All such features 122 may be defined, positioned, and/or illustrated (e.g., symbolized) according to one or more files or data stored within a databank 12. For example, one or more spatial datasets 20, architectural data 16c, or the like may indicate or define the various floors 122a, locations of the sensors, etc. and indicate what symbols, markings, or the like are to represent certain such features 122.

In selected embodiments, a user 18 may click, drag, etc. in order to perform or control selected zoom, rotate, and pan functionality or the like or a combination or sub-combination thereof in order to position the scene view on the rendering device's presentation system 14 to the user's preferred perspective for observing and engaging. Accordingly, if a current view 82 being presented by a presentation system 14 is a micro or "close-up" view of a particular building 120a and a user 18 would like to see a particular feature such as a back side of the building 120a in greater detail, then a user 18 to zoom in or out as needed, rotate to a back side of the building 120a, pan to one side or the other, and the like or a combination or sub-combination thereof as desired or necessary.

A view 82 may include a user-interface element 124. In selected embodiments, a user-interface element may provide controls that enable a user 18 to play, pause, stop, and/or scrub one or more audio files 100. For example, a user-interface element 124 may enable a user 18 to selectively play, pause, stop, and/or scrub a displacement audio file 100, velocity audio file 100, acceleration audio file 100, or any other audio files 100 or combination of audio files 100 in accordance with the present invention. Accordingly, the user-interface element 124 may enable a user 18 to hear any desired combination of one or more of the audio files, drag or otherwise move a play head 126 or the like to play or replay any desired portions of one or more audio files 100, etc. In certain embodiments, a user-interface element 124 may present an audio spectrogram 128 for one or more audio files 100, which may aid a user 18 in visualizing and/or scrubbing to particular events captured or represented within one or more of the audio files 100.

In selected embodiments, a presentation system 14 may control which audio files 100 are available for playing based on a point of view or other selection of a user 18. For example, if a user positions his or her point of view toward or in proximity to a particular sensor 122a, selects a particular sensor 122a, or selects a location proximate a particular sensor 122a from a particular perspective, then the audio files 100 available for playing may correspond to signal output by that sensor in the physical world. However, when a user positions his or her point of view on multiple sensors 122a, selects multiple sensors 122a, or selects a location proximate (e.g., between) multiple sensors 122a, then the audio files 100 available for playing may correspond to signal output by the multiple sensors in the physical world.

When multiple audio files 100 are to be played, the audio files 100 may be weighted or mixed according to a position corresponding to a user 18. Accordingly, if a point of view, selection, or the like of a user 18 is closer to one sensor 122b, then the audio files 100 corresponding to that sensor in the physical world may feature more prominently in the mix. As a result, a user 18 may hear the audio files 100 in a manner that simulated what the user 18 would hear if he or she were in the physical building and the physical sensors output their respective signals as sounds waves.

In selected embodiments, one or more audio files 100 may be played using a head-related transfer function that may add to a sense of dimension, direction, location, etc. for sources of the sound for the user 18 as he or she hears the audio files 100 and occupies a particular point of view in the virtual space being presented by a presentation system 14. In such embodiments, a head-related transfer function may give a user 18 a sense that the sound encoded in the audio files 100 is originating from a sensor 122b corresponding thereto.

In selected situations, a user 18 may select a macro view that encompasses a relatively large number of sensors 122b (e.g., earthquake sensors corresponding to various structures 120 throughout a city or portion thereof). In such situations, the audio files 100 available for playing may correspond to macro phenomena rather than to signal output by the specific, individual sensors.

For example, the audio files 100 available for playing may represent or model a seismic wave or a series of seismic waves of an earthquake as it propagates through the city. That is, an earthquake may be a movement of the ground that travels through the ground in waves. The waves may be characterized as P waves, S waves, Love waves, Rayleigh waves, etc. based on the motion associated therewith. Different seismic waves may travel at different speeds, travel different distances, etc. based on various factorings including the composition of the ground through which the seismic waves are traveling. Accordingly, by audibly and/or visually charactering a seismic wave or a series of seismic waves, a presentation system 14 may assist one or more users 18 in better understanding the corresponding earthquake and how best to respond to it and/or prepare for future earthquakes. In selected embodiments, audio files 100 may be spatialized (e.g., modified or controlled using a head-related transfer function) to add to a sense of dimension, direction, location, etc. for sources of the sound for the user 18 as he or she hears the audio files 100 and occupies a particular point of view being presented by a presentation system 14. In certain embodiments, only structures having sensors that experienced activity above a particular seismic threshold may be visually and/or audibly represented in video content and/or audio files 100 available for playing. Amplitude of the seismic activity and the propagation thereof may be reflected or represented in the video content and/or audio files 100 available for playing.

Figure 8:
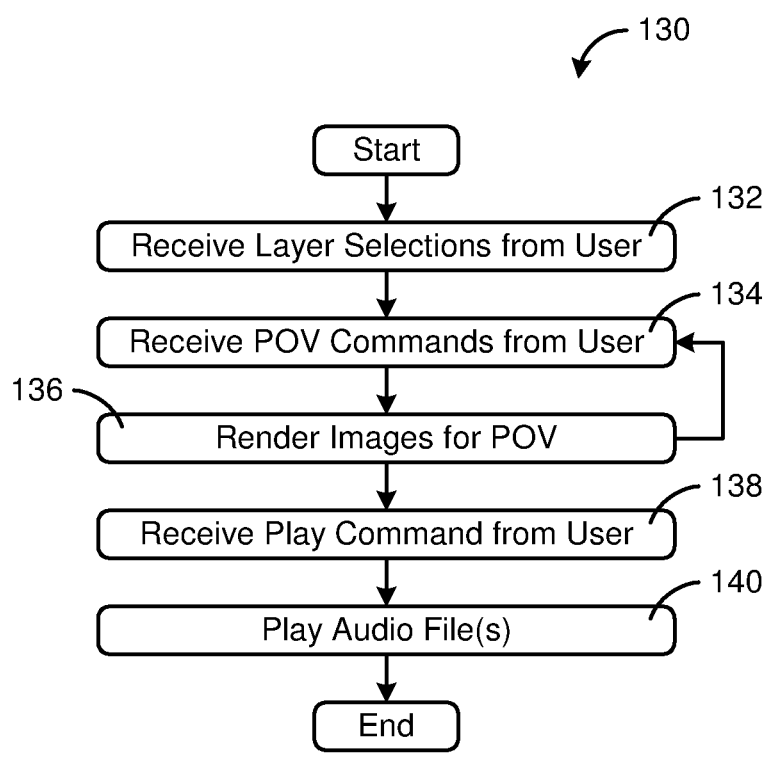
FIG. 8 is a block diagram of one embodiment of a method for interacting with spatial data visually and auditorily in accordance with the present invention.

Referring to FIG. 8, a method 102 of use in accordance with the present invention may include or begin with receiving 132 one or more layer selections from a user 18. The one or more layers so selected may determine what data is to be presented by a presentation system 14 to one or more users 18. A method 102 of use may further include receiving 134 one or more point of view (POV) commands from a user 18. Such commands may communicate to a presentation system 14 how a user 18 would like to view a particular geographic region or the like.

Based on the point of view commands, a presentation system 14 may render 136 one or more images 82 corresponding to the points of view selected by a user 18. As the point of view commands change over time, a presentation system 14 may render 136 updated images 82 in real time with those changes. Accordingly, a user 18 may see images 82 of whatever point of view the user 18 selects in real time with his or her selections.

When audio files 100 and/or video content are available, a presentation system 14 may present a user-interface element 124. Accordingly, through a user-interface element 124, a presentation system 14 may receive 138 commands to play, pause, stop, scrub, or the like one or more audio files 100, video content, video content including one or more audio files 100, or the like. A presentation system 14 may, therefore, play 140 one or more audio files 100 and/or video content in accordance with the commands to received 138.

Figure 9:
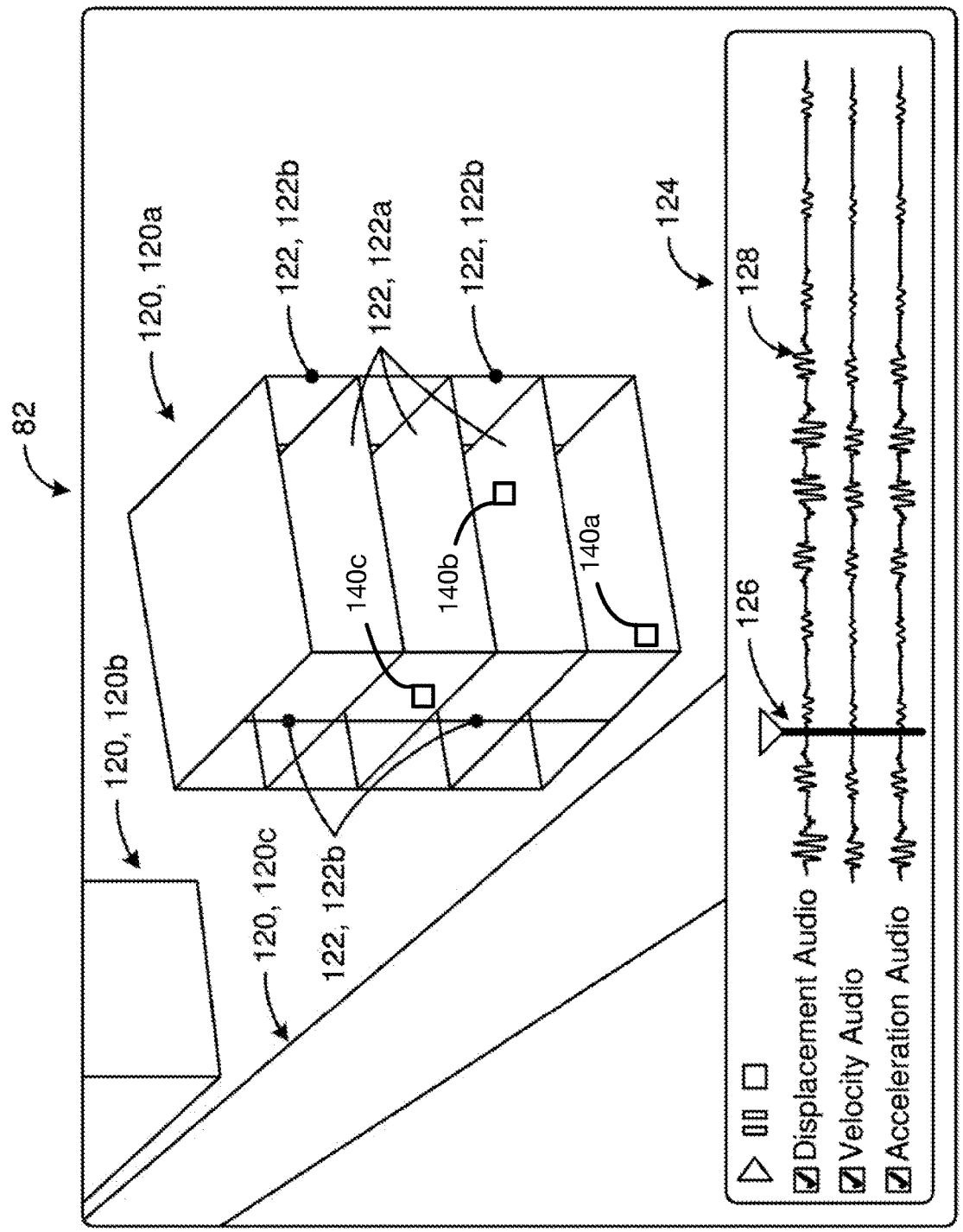
FIG. 9 is an example view of spatial data with micro-association of documentation records to locations within the spatial data in accordance with the present invention.

Referring to FIG. 9, a micro view of a structure 120a may be further annotated with documentation records 140a-140c. Each documentation record 140a-140c may be associated with the geographic location of a structure 120a. Each documentation record 140a-140c may be associated with a location within the structure 120a. This association may include a 3D coordinate within a 3D coordinate system of a model of the structure 120a. This association may include an association with an identifier of an object, element, or other data structure that is part of the 3D model of the structure 120a, such as a data structure representing a particular wall, door, frame member, exterior feature, or any other portion of the structure 120a.

In the image 82, each documentation record 140a-140c may be represented using an icon that visually represents each documentation record 140a-140c and that is rendered at the location, or on the rendering of the data structure, of the 3D model with which the documentation record 140a-140c is associated. The icons may be the same for each documentation record 140a-140c or may be visually distinguished from one another with a label (e.g., documentation record identifier). The icon for a documentation record 140a-140c may indicate contents of the documentation record 140a-140c, such as the type of media included in the documentation record 140a-140c (text, audio, video, images, etc.).

Figure 10:
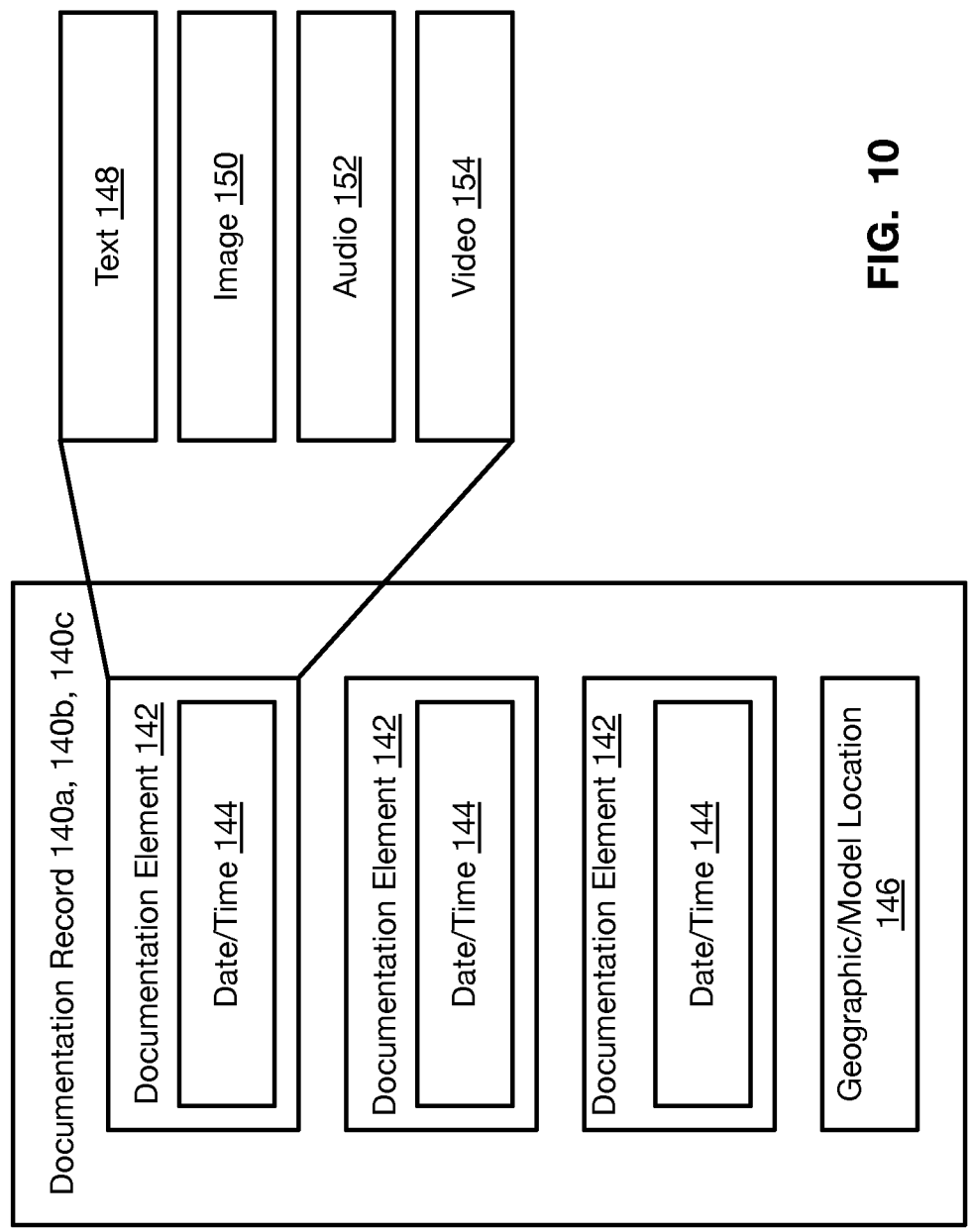
FIG. 10 is a schematic block diagram of a documentation record in accordance with the present invention.

FIG. 10 illustrates a possible implementation of a documentation record 140a-140c. Each documentation record may include one or more documentation elements 142. Each documentation record may be associated with a date and/or time 144. For example, an insurance adjuster, building inspector, or other individual may inspect a particular location of a structure 120a in response to a seismic event or according to an inspection schedule. Accordingly, for each inspection, the individual may create a documentation element 142 for the particular location with the date and/or time 144 corresponding to the date and/or time at which the inspection or occurred to when the documentation element 142 was created. Each documentation element 142 may include media such as text 148, one or more images 150, one or more audio recordings 152, and one or more videos. Each image 150 or video 154 may include a two-dimensional or three-dimensional (e.g., virtual reality) image data. Each video 154 may include a recording at or near the particular location with which the documentation record 142 is associated. Text 148 may include notes of the individual, results of measurements, or other data that may be represented using alphanumeric characters. Audio recordings 152 may include voice recordings of the individual, sonifications of sensor data according to any of the approaches described herein, or other audio data.

Each documentation record 140a-140c may include location data 146 corresponding to the particular location. The location data 146 may include geographic data (GPS coordinates, street address, etc.) and may include a model location. The model location may include a 3D coordinate within a 3D coordinate system of a model of the structure 120a. This association may include an association with an identifier of an object, element, or other data structure that is part of the 3D model of the structure 120a, such as a data structure representing a particular wall, door, frame member, exterior feature, or any other portion of the structure 120a.

Figure 11:
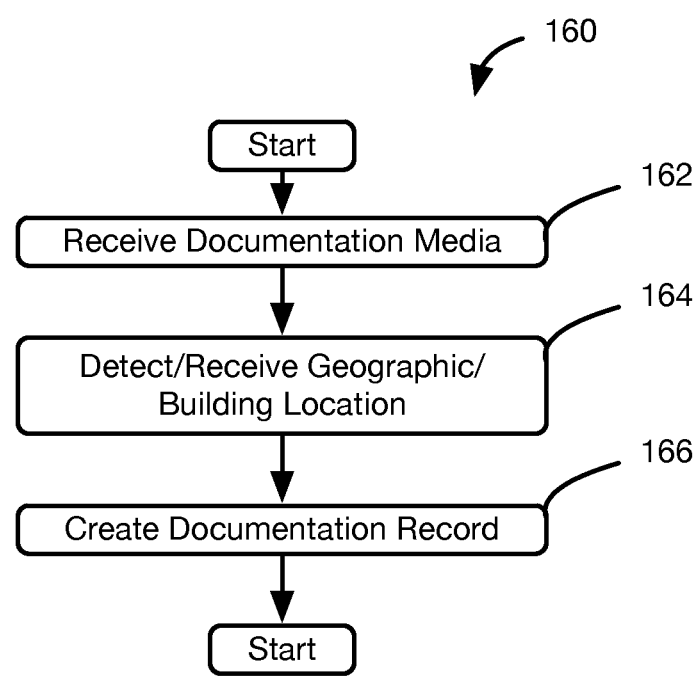
FIG. 11 is a block diagram of one embodiment of a method for creating a documentation record in accordance with the present invention.

FIG. 11 illustrates a method 160 for creating a documentation record 140a-140c. The method 160 may include receiving 162 documentation media, which may include some or all of the text 148, one or more images 150, one or more audio recordings 152, one or more videos 154, or other media.

The method 160 may include receiving 164 or detecting a location. The location may include one or both of a geographic location and a location within a model of the structure 120a. Receiving 164 a location may include receiving an input from the individual interacting with a rendering of a 3D model of the structure 120a. For example, the user may select a location on a rendering of the 3D model that is then related to a 3D coordinate of the selected location or an identifier of a data structure at the location. The location may be detected by detecting a location of the individual (e.g., a GPS coordinate detected using a GPS receiver in a device held by the individual), detecting an altitude of the user (e.g., using an altimeter in the device held by the individual), and relating the location and altitude to a location within the 3D model of the structure. Detecting the location of the user may include capturing one or more images (2D or 3D) using a camera in the device held by the individual. This image may then be matched to a location within the 3D model of the structure 120a.

If a documentation record 140a-140c is not associated with the location detected at step 164, then one is created 166 and populated with the media from step 162 and the location data from step 164. If a documentation record 140a-140c is associated with the location, then a documentation element 142 may be added to that documentation record 140a-140c, the documentation element including the media from step 162. Whether a documentation record 140a-140c is associated with the detected location from step 164 may be determined by evaluating whether the location detected at step 164 is within a tolerance (e.g., within an X meter radius, where X is the tolerance) of the location 146 of an existing documentation record 140a-140c.

Note that in some instances, an individual may simply associated a documentation record 140a-140c generally rather than with a particular location on the structure 120a. In such instances, the location 146 in the documentation record 140a-140c may include a default location, such as a location at a main entrance of the structure 120a.

Figure 12:
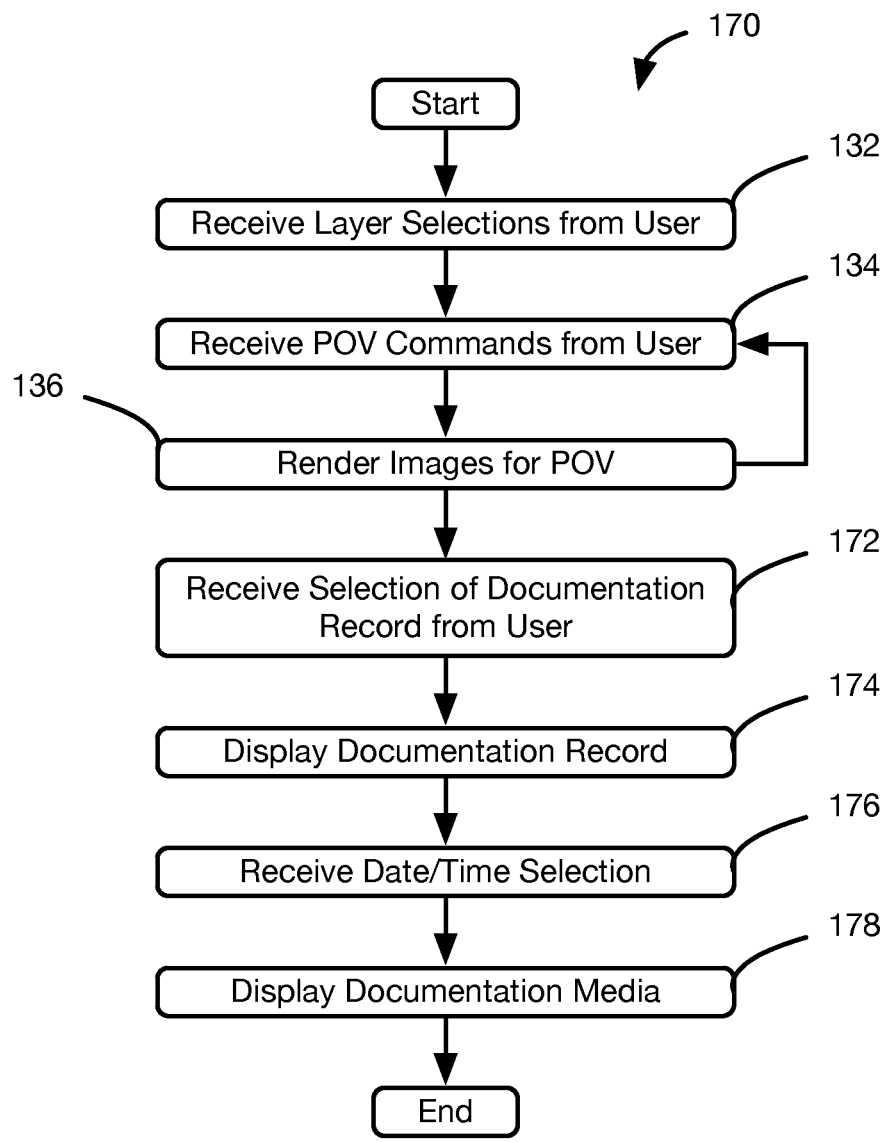
FIG. 12 is a block diagram of one embodiment of a method for presenting and accessing documentation records in accordance with the present invention.

FIG. 12 illustrates a method 170 for accessing documentation records 140a-140c associated with a structure 120a. The method 170 may include navigating to a 3D model of the structure 120a and navigating to a particular view of the 3D model of the structure 120a. In the illustrated embodiment, this includes performing some or all of steps 132-136 as described above with respect to FIG. 7. In particular, rendering 136 images for a POV may include rendering icons representing documentation records 140a-140c at locations in the rendering corresponding to the location data 146 of each documentation record 140a-140c.

The method 170 may further include receiving 172 selection of a documentation record 140a-140c from the rendering from step 136. Receiving 172 selection of a documentation record 140a-140c may include receiving user interaction with an icon representing the documentation record 140a-140c (mouse click, tap on a touch screen, selection using keystrokes, etc.). In response to receiving 172 selection of the documentation record 140a-140c, the documentation record may be displayed 174. Displaying 174 may include displaying a listing in which each element of the listing represents a documentation element 142. For example, each element may list the date and/or time 144 of one of the documentation elements 142. The method 170 may include receiving 176 selection of a date and/or time from the listing, which invokes display 178 of documentation media from the documentation element 142 corresponding the selected date and/or time. Documentation media may be displayed 178 as a listing of elements that, when selected, invokes display of the media associated with the selected element of the listing of elements (display of image or video, play back of audio, display of text, etc.).

The flowcharts in FIGS. 6, 8, 11, and 12 illustrate the architecture, functionality, and operation of possible implementations of systems, methods, and computer-program products according to various embodiments in accordance with the present invention. In this regard, each block in the flowcharts may represent a module, segment, or portion of code, which comprises one or more executable instructions for implementing the specified logical function(s). It will also be noted that each block and/or combinations of blocks may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively or in addition thereto, certain steps or functions may be omitted if not needed.

In selected embodiments, a system 10 in accordance with the present invention may be or comprise a computer-program product tangibly embodied in a non-transitory computer readable medium. In certain such embodiments, the computer-program product may comprise instructions to cause one or more processors to: (1) store one or more audio files, wherein each audio file of the one or more audio files is a sonification of a signal corresponding to one or more physical sensors located within a physical building; (2) render, from a point of view selected by a user, one or more images of a virtual model of the physical building; (3) render one or more virtual sensors within the one or more images, wherein each virtual sensor is positioned within the virtual model so as to match a location of a corresponding physical sensor of the one or more physical sensors within the physical building; (4) receive, from the user, an instruction to play at least one audio file of the one or more audio files; and (5) play, in response to receiving the instruction, the at least one audio file.

In certain embodiments, the computer-program product may be further characterized in that the signal corresponding to the one or more physical sensors further corresponds to a period of time in which the physical building experienced a seismic event.

In certain embodiments, the computer-program product may be further characterized in that the at least one audio file played in response to receiving the instruction comprises more than one audio file.

In certain embodiments, the computer-program product may be further characterized in that the more than one audio file comprises a first audio file of the one or more audio files that is a sonification of a displacement signal corresponding to a first physical sensor of the one or more physical sensors.

In certain embodiments, the computer-program product may be further characterized in that the more than one audio file further comprises a second audio file of the one or more audio files that is a sonification of a velocity signal corresponding to the first physical sensor.

In certain embodiments, the computer-program product may be further characterized in that the more than one audio file further comprises a third audio file of the one or more audio files that is a sonification of an acceleration signal corresponding to the first physical sensor.

In certain embodiments, the computer-program product may be further characterized in that the first, second, and third audio files are played in a synchronized manner in response to receiving the instruction.

In certain embodiments, the computer-program product may be further characterized in that: (1) a location of a first virtual sensor of the one or more virtual sensors within the virtual model matches a location of the first physical sensor within the physical building; and (2) the first virtual sensor is spaced a first distance from the point of view.

In certain embodiments, the computer-program product may be further characterized in that the more than one audio file further comprises: (1) a fourth audio file of the one or more audio files that is a sonification of a displacement signal corresponding to a second physical sensor of the one or more physical sensors; (2) a fifth audio file of the one or more audio files that is a sonification of a velocity signal corresponding to the second physical sensor; and (3) a sixth audio file of the one or more audio files that is a sonification of an acceleration signal corresponding to the second physical sensor.

In certain embodiments, the computer-program product may be further characterized in that the first, second, third, fourth, fifth, and sixth audio files are played in a synchronized manner in response to receiving the instruction.

In certain embodiments, the computer-program product may be further characterized in that: (1) a location of a second virtual sensor of the one or more virtual sensors within the virtual model matches a location of the second physical sensor within the physical building; and (2) the second virtual sensor is spaced a second distance from the point of view.

In certain embodiments, the computer-program product may be further characterized in that: (1) at a first moment in time while the more than one audio file is being played, the second distance is greater than the first distance: and (2) at the first moment in time the first, second, and third audio files predominate over the fourth, fifth, and sixth audio files.

In certain embodiments, the computer-program product may be further characterized in that: (1) at a second moment in time while the more than one audio file is being played, the second distance is less than the first distance; and (2) at the second moment in time the fourth, fifth, and sixth audio files predominate over the first, second, and third audio files.

In selected embodiments, a computer system in accordance with the present invention may comprise: (1) memory storing one or more audio files, wherein each audio file of the one or more audio files is a sonification of a signal corresponding to one or more physical sensors located within a physical building; (2) the memory further storing a virtual model of the physical building; (3) a presentation system rendering, from a point of view selected by a user, one or more images of the virtual model; (4) the presentation system further rendering one or more virtual sensors within the one or more images, wherein each virtual sensor is positioned within the virtual model so as to match a location of a corresponding physical sensor of the one or more physical sensors within the physical building; (5) the presentation system programmed to receive, from the user, an instruction to play at least one audio file of the one or more audio files; and (6) the presentation system further programmed to play the at least one audio file in response to receiving the instruction.

In certain embodiments, the computer system may be further characterized in that the signal corresponding to the one or more physical sensors further corresponds to a period of time in which the physical building experienced a seismic event.

In certain embodiments, the computer system may be further characterized in that the at least one audio file comprises: (1) a first audio that is a sonification of a signal corresponding to a first physical sensor of the one or more physical sensors; and (2) a second audio file that is a sonification of a signal corresponding to a second physical sensor of the one or more physical sensors.

In certain embodiments, the computer system may be further characterized in that the presentation system is further programmed to play a mix of the first audio file and the second audio file in response to receiving the instruction.

In certain embodiments, the computer system may be further characterized in that: (1) a location of a first virtual sensor of the one or more virtual sensors within the virtual model matches a location of the first physical sensor; and (2) a location of a second virtual sensor of the one or more virtual sensors within the virtual model matches a location of the second physical sensor.

In certain embodiments, the computer system may be further characterized in that: (1) the presentation system is further programmed for the first audio file to predominate over the second audio file within the mix when the point of view is closer to the first virtual sensor than to the second virtual sensor; and (2) the presentation system is further programmed for the second audio file to predominate over the first audio file within the mix when the point of view is closer to the second virtual sensor than to the first virtual sensor.

In certain embodiments, the computer system may be further characterized in that: (1) the first audio file is a sonification of a displacement, velocity, or acceleration signal corresponding to the first physical sensor; and (2) the second audio file is a sonification of a displacement, velocity, or acceleration signal corresponding to the second physical sensor.

In selected embodiments, a system 10 in accordance with the present invention may be or comprise a computer-program product tangibly embodied in a non-transitory computer readable medium. In certain such embodiments, the computer-program product may comprise instructions to cause one or more processors to: (1) store one or more first files defining a plurality of geographic features oriented with respect to one another in a geographic coordinate system, the plurality of geographic features comprising a first building; (2) store one or more second files defining a plurality of intra-building features oriented with respect to one another in a building coordinate system, the plurality of intra-building features being features contained within the first building; (3) render, from a first point of view, one or more first images of the plurality of geographic features; (4) present, in response to receiving a first command from a first user to transition from the first point of view to a second point of view, a series of images that gradually progress from the first point of view to the second point of view; and (5) render, from the second point of view, one or more images of the plurality of intra-building features.

In certain embodiments, the computer-program product may be further characterized in that the instructions further cause the one or more processors to scrub according to a selection of the first user backward or forward with respect to time though the one or more first images of the plurality of geographic features.

In certain embodiments, the computer-program product may be further characterized in that the instructions further cause the one or more processors to: (1) present, in response to receiving a second command from the first user to transition from the second point of view to a third point of view, a series of images that gradually progress from the second point of view to the third point of view; and (2) render, from the third point of view, one or more second images of the plurality of the plurality of geographic features.

In certain embodiments, the computer-program product may be further characterized in that the one or more images of the plurality of intra-building features depict (1) a virtual model of the first building and (2) one or more virtual sensors within the virtual model.

In certain embodiments, the computer-program product may be further characterized in that the instructions further cause the one or more processors to store one or more audio files, wherein each audio file of the one or more audio files is a sonification of a signal corresponding to at least one virtual sensor of the one or more virtual sensors.

In certain embodiments, the computer-program product may be further characterized in that the instructions further cause the one or more processors to receive, from the first user, an instruction to play at least one audio file of the one or more audio files.

In certain embodiments, the computer-program product may be further characterized in that the instructions further cause the one or more processors to scrub according to a selection of the first user backward or forward with respect to time though the at least one audio file.

In certain embodiments, the computer-program product may be further characterized in that the instructions further cause the one or more processors to: (1) display the one or more first images of the plurality of geographic features to the first user; and (2) indicate, within the one or more first images of the plurality of geographic features as they are displayed to the first user, a current point of view corresponding to second user.

In certain embodiments, the computer-program product may be further characterized in that the instructions further cause the one or more processors to present to the first user a plurality of layers, each layer of the plurality of layers comprising a different overlay of geospatial data.

In certain embodiments, the computer-program product may be further characterized in that the instructions further cause the one or more processors to: (1) receive a request from the first user to display a first layer of the plurality of layers; and (2) overlay, in response to the request, the first layer on the one or more first images of the plurality of geographic features.

In certain embodiments, the computer-program product may be further characterized in that the plurality of layers comprises at least one layer directed to geospatial weather data, geospatial traffic data, geospatial fire data, geospatial emergency response data, geospatial property damage data, or geospatial crime data.

In selected embodiments, a computer system in accordance with the present invention may comprise: (1) memory storing (a) one or more first files defining a plurality of geographic features oriented with respect to one another in a geographic coordinate system, the plurality of geographic features comprising a first building, and (b) one or more second files defining a plurality of intra-building features oriented with respect to one another in a building coordinate system, the plurality of intra-building features being features contained within the first building; (2) one or more processors connected to run one or more modules stored in the memory; and (3) the memory further storing a user-interface module programmed to (a) render, from a first point of view, one or more images of the plurality of geographic features, (b) present, in response to receiving a command from a first user to transition from the first point of view to a second point of view, a series of images that gradually progress from the first point of view to the second point of view, and (c) render, from the second point of view, one or more images of the plurality of intra-building features.

In certain embodiments, the computer system may be further characterized in that the user-interface module is further programmed to scrub according to a selection of the first user backward or forward with respect to time though the one or more images of the plurality of geographic features.

In certain embodiments, the computer system may be further characterized in that the one or more images of the plurality of intra-building features depict (1) a virtual model of the first building and (2) one or more virtual sensors within the virtual model.

In certain embodiments, the computer system may be further characterized in that the memory further stores one or more audio files, wherein each audio file of the one or more audio files is a sonification of a signal corresponding to at least one virtual sensor of the one or more virtual sensors.

In certain embodiments, the computer system may be further characterized in that the user-interface module is further programmed to receive, from the first user, an instruction to play at least one audio file of the one or more audio files.

In certain embodiments, the computer system may be further characterized in that the user-interface module is further programmed to scrub according to a selection of the first user backward or forward with respect to time though the at least one audio file.

In certain embodiments, the computer system may be further characterized in that the user-interface module is further programmed to: (1) display the one or more images of the plurality of geographic features to the first user; and (2) indicate, within the one or more images of the plurality of geographic features as they are displayed to the first user, a current point of view corresponding to second user.

In certain embodiments, the computer system may be further characterized in that the user-interface module is further programmed to present to the first user a plurality of layers, each layer of the plurality of layers comprising a different overlay of geospatial data.

In certain embodiments, the computer system may be further characterized in that the user-interface module is further programmed to: (1) receive a request from the first user to display a first layer of the plurality of layers; and (2) overlay, in response to the request, the first layer on the one or more images of the plurality of geographic features.

In certain embodiments, the computer system may be further characterized in that the plurality of layers comprises at least one layer directed to geospatial weather data, geospatial traffic data, geospatial fire data, geospatial emergency response data, geospatial property damage data, or geospatial crime data.

References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Such phrases are not necessarily referring to the same embodiment.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A computer-program product tangibly embodied in a non-transitory computer readable medium, comprising instructions to cause one or more processors to:
   store one or more audio files, wherein each audio file of the one or more audio files is a sonification of a signal corresponding to one or more physical sensors located within a physical building;
   render, from a point of view selected by a user, one or more images of a virtual model of the physical building;
   render one or more virtual sensors within the one or more images, wherein each virtual sensor is positioned within the virtual model so as to match a location of a corresponding physical sensor of the one or more physical sensors within the physical building;
   receive, from the user, an instruction to play at least one audio file of the one or more audio files; and
   play, in response to receiving the instruction, the at least one audio file;
   wherein the signal corresponding to the one or more physical sensors further corresponds to a period of time in which the physical building experienced a seismic event;
   wherein the at least one audio file played in response to receiving the instruction comprises more than one audio file;
   wherein the more than one audio file comprises a first audio file of the one or more audio files that is a sonification of a displacement signal corresponding to a first physical sensor of the one or more physical sensors;
   wherein the more than one audio file further comprises a second audio file of the one or more audio files that is a sonification of a velocity signal corresponding to the first physical sensor.

2. The computer-program product of claim 1, wherein the more than one audio file further comprises a third audio file of the one or more audio files that is a sonification of an acceleration signal corresponding to the first physical sensor.

3. The computer-program product of claim 2, wherein the first, second, and third audio files are played in a synchronized manner in response to receiving the instruction.

4. The computer-program product of claim 3, wherein:
   a location of a first virtual sensor of the one or more virtual sensors within the virtual model matches a location of the first physical sensor within the physical building; and
   the first virtual sensor is spaced a first distance from the point of view.

5. The computer-program product of claim 4, wherein the more than one audio file further comprises:
   a fourth audio file of the one or more audio files that is a sonification of a displacement signal corresponding to a second physical sensor of the one or more physical sensors;
   a fifth audio file of the one or more audio files that is a sonification of a velocity signal corresponding to the second physical sensor; and
   a sixth audio file of the one or more audio files that is a sonification of an acceleration signal corresponding to the second physical sensor.

6. The computer-program product of claim 5, wherein the first, second, third, fourth, fifth, and sixth audio files are played in a synchronized manner in response to receiving the instruction.

7. The computer-program product of claim 6, wherein:
   a location of a second virtual sensor of the one or more virtual sensors within the virtual model matches a location of the second physical sensor within the physical building;
   the second virtual sensor is spaced a second distance from the point of view.

8. The computer-program product of claim 7, wherein:
   at a first moment in time while the more than one audio file is being played, the second distance is greater than the first distance; and
   at the first moment in time the first, second, and third audio files predominate over the fourth, fifth, and sixth audio files.

9. The computer-program product of claim 8, wherein:
   at a second moment in time while the more than one audio file is being played, the second distance is less than the first distance; and
   at the second moment in time the fourth, fifth, and sixth audio files predominate over the first, second, and third audio files.

10. A computer system comprising:
    memory storing one or more audio files, wherein each audio file of the one or more audio files is a sonification of a signal corresponding to one or more physical sensors located within a physical building;
    the memory further storing a virtual model of the physical building;
    a presentation system rendering, from a point of view selected by a user, one or more images of the virtual model;
    the presentation system further rendering one or more virtual sensors within the one or more images, wherein each virtual sensor is positioned within the virtual model so as to match a location of a corresponding physical sensor of the one or more physical sensors within the physical building;
    the presentation system programmed to receive, from the user, an instruction to play at least one audio file of the one or more audio files; and
    the presentation system further programmed to play the at least one audio file in response to receiving the instruction;
    wherein the signal corresponding to the one or more physical sensors further corresponds to a period of time in which the physical building experienced a seismic event;
    wherein the at least one audio file comprises:
        a first audio file that is a sonification of a signal corresponding to a first physical sensor of the one or more physical sensors; and
        a second audio file that is a sonification of a signal corresponding to a second physical sensor of the one or more physical sensors.

11. The computer system of claim 10, wherein the presentation system is further programmed to play a mix of the first audio file and the second audio file in response to receiving the instruction.

12. The computer system of claim 11, wherein:
    a location of a first virtual sensor of the one or more virtual sensors within the virtual model matches a location of the first physical sensor; and
    a location of a second virtual sensor of the one or more virtual sensors within the virtual model matches a location of the second physical sensor.

13. The computer system of claim 12, wherein:
the presentation system is further programmed for the first audio file to predominate over the second audio file within the mix when the point of view is closer to the first virtual sensor than to the second virtual sensor; and
the presentation system is further programmed for the second audio file to predominate over the first audio file within the mix when the point of view is closer to the second virtual sensor than to the first virtual sensor.

14. The computer system of claim 13, wherein:
the first audio file is a sonification of a displacement, velocity, or acceleration signal corresponding to the first physical sensor; and
the second audio file is a sonification of a displacement, velocity, or acceleration signal corresponding to the second physical sensor.

* * * * *